US011442938B2

(12) United States Patent
Turkovich et al.

(10) Patent No.: US 11,442,938 B2
(45) Date of Patent: Sep. 13, 2022

(54) INTELLIGENT TARGETED REASONING

(71) Applicant: The Charles Stark Draper Laboratory, Inc., Cambridge, MA (US)

(72) Inventors: John Joseph Turkovich, Westford, MA (US); Jeffrey Joseph Cipolloni, Lexington, MA (US); Martin Svedlow, Reading, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 479 days.

(21) Appl. No.: 15/964,556

(22) Filed: Apr. 27, 2018

(65) Prior Publication Data

US 2019/0332707 A1 Oct. 31, 2019

(51) Int. Cl.
*G06F 16/2455* (2019.01)
*G06F 16/248* (2019.01)
*G06F 16/28* (2019.01)

(52) U.S. Cl.
CPC ...... *G06F 16/24553* (2019.01); *G06F 16/248* (2019.01); *G06F 16/284* (2019.01)

(58) Field of Classification Search
CPC . G06F 16/24553; G06F 16/284; G06F 16/248
See application file for complete search history.

(56) References Cited

U.S. PATENT DOCUMENTS

| | | | | |
|---|---|---|---|---|
| 2003/0233401 A1* | 12/2003 | Dean | ...................... | G06F 16/25 709/202 |
| 2004/0153435 A1* | 8/2004 | Gudbjartsson | ........ | G06F 16/284 |
| 2009/0138415 A1* | 5/2009 | Lancaster | ................ | G06N 5/04 706/11 |
| 2009/0313202 A1* | 12/2009 | Grabarnik | ......... | G06F 16/24578 706/50 |
| 2011/0307263 A1* | 12/2011 | Bader | .................... | G06Q 30/06 705/1.1 |
| 2013/0262378 A1* | 10/2013 | Wilson | ................... | G06Q 10/00 707/611 |
| 2016/0179934 A1* | 6/2016 | Stubley | ............... | G06F 16/3329 707/722 |

(Continued)

*Primary Examiner* — Alford W Kindred
*Assistant Examiner* — Lin Lin M Htay
(74) *Attorney, Agent, or Firm* — Hamilton, Brook, Smith & Reynolds, P.C.

(57) ABSTRACT

Some embodiments enable intelligent searching data based on structure and content of models defining structure domains of interest. Embodiments are also capable of simultaneously providing context sensitive reasoning across the domains to find other relationships within the data that are not apparent using traditional search. For a respective domain-specific model, a method or system reasons relationships within the respective domain-specific model. Each relationship is between a keyword of a search query inputted by a user and a field of the domain-specific model. The method reasons the relationships by traversing the domain-specific model using domain-specific rules selected by the keyword. The method maps a first field of a first reasoned relationship to a second field of a second reasoned relationship. The first and second fields are in respective first and second domain-specific models. The method executes the search query based on the mapping, which generates search results presented to the user.

21 Claims, 17 Drawing Sheets

(56) References Cited

U.S. PATENT DOCUMENTS

2016/0180438 A1* 6/2016 Boston ............... G06Q 30/0282
705/26.7
2017/0235848 A1* 8/2017 Van Dusen ............. G06F 30/20
705/12

* cited by examiner

INTELLIGENT TARGETED REASONING

GOVERNMENT SUPPORT

This invention was made with government support under N00030-14-G-0050, Task Order 15, from the Department of Defense. The government has certain rights in the invention.

BACKGROUND

Data repositories across networks, such as the Internet, store vast amounts of structured and unstructured data. Search engines can retrieve information based upon input keyword terms or phrases.

SUMMARY

Embodiments of the present disclosure are directed to computer methods, systems, and program products for performing an intelligent targeted search and discovery of information.

In an embodiment, a method, for a respective domain-specific model of one or more domain-specific models, reasons (e.g., infer, infers, inference, inferencing, deduction, predicate calculus, and any other type of reasoning known to one skilled in the art) a plurality of relationships within the respective domain-specific model. Each of the plurality of relationships is between a keyword term of a search query inputted by a user and a field of the domain-specific model. The keyword term may be provided for search query, results filtering, or other computer-implemented applications. The method reasons (e.g., infers) the plurality of relationships by traversing the domain-specific model according to domain-specific rules selected by the inputted keyword terms.

The method maps a first field of a first reasoned (e.g., inferred) relationship to a second field of a second reasoned (e.g., inferred) relationship. The first field and second field are in respective first and second domain-specific models. The method executes the search query, results query, or other computer-implemented applications based on the mapping. The execution of the search query generates one or more search results presented to the user.

In an embodiment, a system includes a processor and a memory with computer code instructions stored therein. The memory is operatively coupled to the processor such that the computer code instructions configure the processor to implement a controller. The controller is configured to reason (e.g., infer), for a respective domain-specific model of one or more domain-specific models, a plurality of relationships within the respective domain-specific model. Each of the plurality of relationships is between a keyword term of a search query inputted by a user and a field of the domain-specific model. The keyword term may be provided for search query, results filtering, or other computer-implemented applications. The controller is further configured to reason (e.g., infer) the plurality of relationships by performing a traversal of the domain-specific model according to domain-specific rules selected by the inputted keyword terms. The controller is further configured to map a first field of a first reasoned (e.g., inferred) relationship to a second field of a second reasoned (e.g., inferred) relationship. The first field and second field are in respective first and second domain-specific models. The controller is further configured to execute the search query based on the mapping. The execution of the search query generates one or more search results presented to the user.

In an embodiment, a computer program product includes a non-transitory computer-readable medium configured to store instructions for performing an intelligent targeted search. The instructions, when loaded and executed by a processor, cause the processor to reason (e.g., infer), for a respective domain-specific model of one or more domain-specific models, a plurality of relationships within the respective domain-specific model. Each of the plurality of relationships is between a keyword term of a search query inputted by a user and a field of the domain-specific model. The keyword term may be provided for search query, results filtering, or other computer-implemented applications. The processor reasons (e.g., infers) the plurality of relationships by traversing the domain-specific model according to domain-specific rules selected by the inputted keyword terms. The processor is configured to map a first field of a first reasoned (e.g., inferred) relationship to a second field of a second reasoned (e.g., inferred) relationship. The first field and second field are in respective first and second domain-specific models. The processor is configured to execute the search query based on the mapping. The processor generates, based on the execution, one or more search results and presents the one or more search results to the user.

In an embodiment, the system, method, and computer program product map subsequent reasoned (e.g., inferred) relationships from an Nth reasoned (e.g., inferred) relationship to an (N+1)th reasoned (e.g., inferred) relationship.

In an embodiment, the system, method, and computer program product find one or more facts associated with the inputted keyword terms based on the mapping.

In an embodiment, the system, method, and computer program product identify documents in a data repository associated with the inputted keyword terms along at least one path of the one or more domain-specific models based on the mapping. Data repositories herein may include but are not limited to databases, file systems, web sites, SHARE-POINT repositories, or other data repositories known to those skilled in the art.

In an embodiment, the system, method, and computer program product identify one or more convergent paths within the one or more domain-specific models associated with the inputted keyword terms.

In an embodiment, the system, method, and computer program product identify one or more exploration paths within the one or more domain-specific models associated with the inputted keyword terms.

In an embodiment, the system, method, and computer program product identify one or more comparative evaluations of findings along paths within the one or more domain-specific models associated with the inputted keyword terms.

In an embodiment, the system, method, and computer program product postulate an analysis mode defining a domain-specific problem associated with the inputted keyword terms. The system, method, and computer program product assign one or more values to the postulated analysis mode. The system, method, and computer program product compare one or more values associated with the postulated analysis mode.

In an embodiment, the plurality of relationships includes two or more homogeneous relationships. In an embodiment, the first reasoned (e.g., inferred) relationship and the second reasoned (e.g., inferred) relationship are heterogeneous relationships.

In an embodiment, the system, method, and computer program product perform reasoning (e.g., inferencing or inferring) that includes traversing one domain-specific model of the one or more domain-specific models. In an embodiment, the system, method, and computer program product perform reasoning (e.g., inferencing or inferring) that includes traversing across two or more models of the domain-specific models.

In an embodiment, the inputted keyword terms may form a partial word, a phrase, sentence, or question.

In an embodiment, the domain-specific models can be an integration of multiple domain-specific models.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
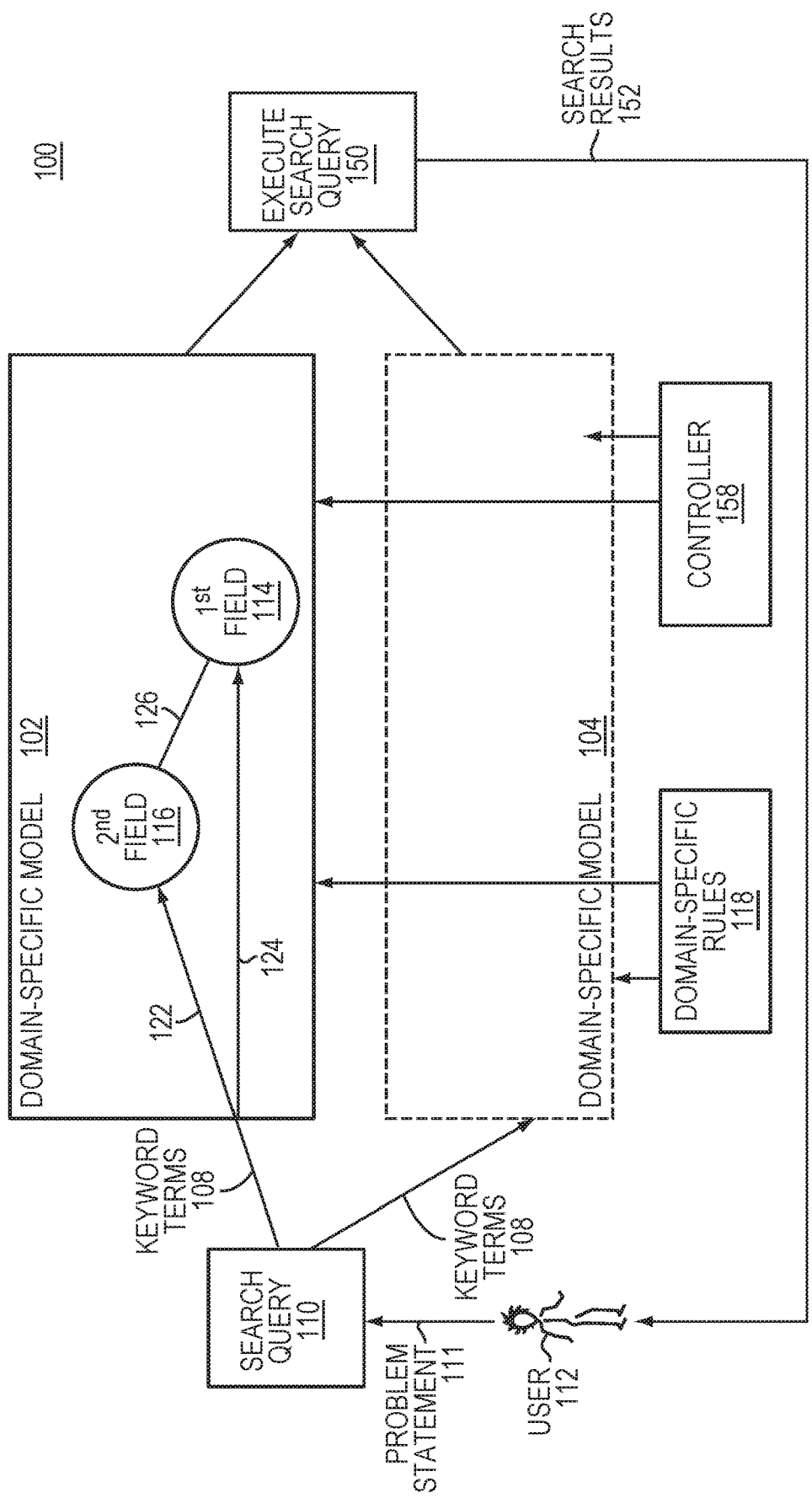
FIGS. 1A-C, FIG. 2, and FIGS. 3A-C are high-level block diagrams that illustrate example embodiments of systems employed by the present disclosure.

A description of example embodiments follows.

The teachings of all patents, published applications and references cited herein are incorporated by reference in their entirety.

Existing search engines have multiple problems. First, existing search engines perform poorly when attempting to return relevant results from enterprise repositories. Second, existing search engines return additional and extraneous information that is not helpful to a user query of interest. Third, existing search engines rely on large volumes of generic historical information and generic historical statistics (e.g., of users), which are particularly cumbersome to manage. For example, existing search engines provide results based on models indicating results users have previously selected, but not based on the context of the user's search. Fourth, existing approaches are not adaptable for domain specific searches. For example, existing search engines provide options under their Advanced Search Criteria that are not domain specific. For many existing domains there is too much information for a user to easily parse through and understand what information is relevant to a user. A user often is looking at a domain and trying to solve a problem about that domain. It can be challenging for a user to obtain targeted information about such technologies.

Current approaches rely on statistics that are based on user searches and documents selected from returned search results. These existing approaches work well for internet searches, where there are large numbers of users performing large numbers of searches.

Embodiments of the present disclosure solve the problems associated with existing approaches. Embodiments perform efficient and effective searching by returning targeted search results that are closely coupled to the keyword term or phrases input to the search. Embodiments do not require extensive source data repositories, but rather employ domain-specific models, domain data, and contextual information to guide and constrain searches within selected information repositories. Examples of such information repositories can be enterprise information repositories. Some embodiments allow users to take one or more models of one or more domains and use those models as the basis for understanding the problem that the user is addressing within the context of those domains.

In an embodiment, a search query formulator interfaces with a domain-specific model, domain-specific data, and user contextual documents. Domain-specific models identify entities and relationships among them. Domain-specific data include instances of model entities and relationships. User contextual documents may include opened and closed documents that reside in specific areas of one or more repositories.

In an alternative embodiment, a method, system and computer program product complement provide guided and constrained searches with statistics based on user actions.

Embodiments have multiple advantages compared with existing approaches. First, by using domain-specific models and domain-specific data, embodiments perform search queries and return search results that are highly relevant for a user's needs and more relevant than in existing approaches. Second, by providing an efficient search with targeted search results, embodiments provide improvements including but not limited to fields of Human Systems Technology and Human Systems Engineering. By providing an efficient search with targeted search results, embodiments provide functional improvements to one or more domains that have a model representation including but not limited to fields of Human Systems Technology, Human Systems Engineering, Context Sensitive Help, Context Sensitive Guidance, and other fields that utilize domains known to one skilled in the art. Third, embodiments enable data or information to be intelligently searched based on the structure and content of plural models that define a structure of one or more domains of interest. Fourth, in addition to performing a search, embodiments are capable of simultaneously providing context sensitive reasoning across the one or more domains to find other relationships within the data or information that are not readily apparent using traditional search methods.

FIGS. 1A-C and 2-3 are high-level block diagrams that illustrate example embodiments of systems employed by the present disclosure.

As illustrated in the system 100 of FIG. 1A, for a respective domain-specific model 102 of one or more domain-specific models 102, 104, the controller 158 reasons (e.g., infer, infers, inference, inferencing, deduction, predicate calculus, and any other type of reasoning known to one skilled in the art) relationships 122, 124, 126 within the respective domain-specific model 102. Each of the relationships 122, 124, 126 is between one or more keyword terms 108 of a search query 110 inputted by a user 112 manually, or by another system automatically. The search query 110 can be a recast problem statement 111. The controller 158 reasons (e.g., infers) the relationships 122, 124, 126 by traversing the domain-specific model 102 according to domain-specific rules 118 selected by the inputted keyword terms 108.

In an embodiment, the first field 114 and second field 116 are in, associated with, or within a first domain-specific model 102. The controller 158 maps 126 a first field 114 of a first reasoned (e.g., inferred) relationship 124 to a second field 116 of a second reasoned (e.g., infer, infers, inference, inferencing, deduction, predicate calculus, and any other type of reasoning known to one skilled in the art) relationship 122.

Figure 1B:
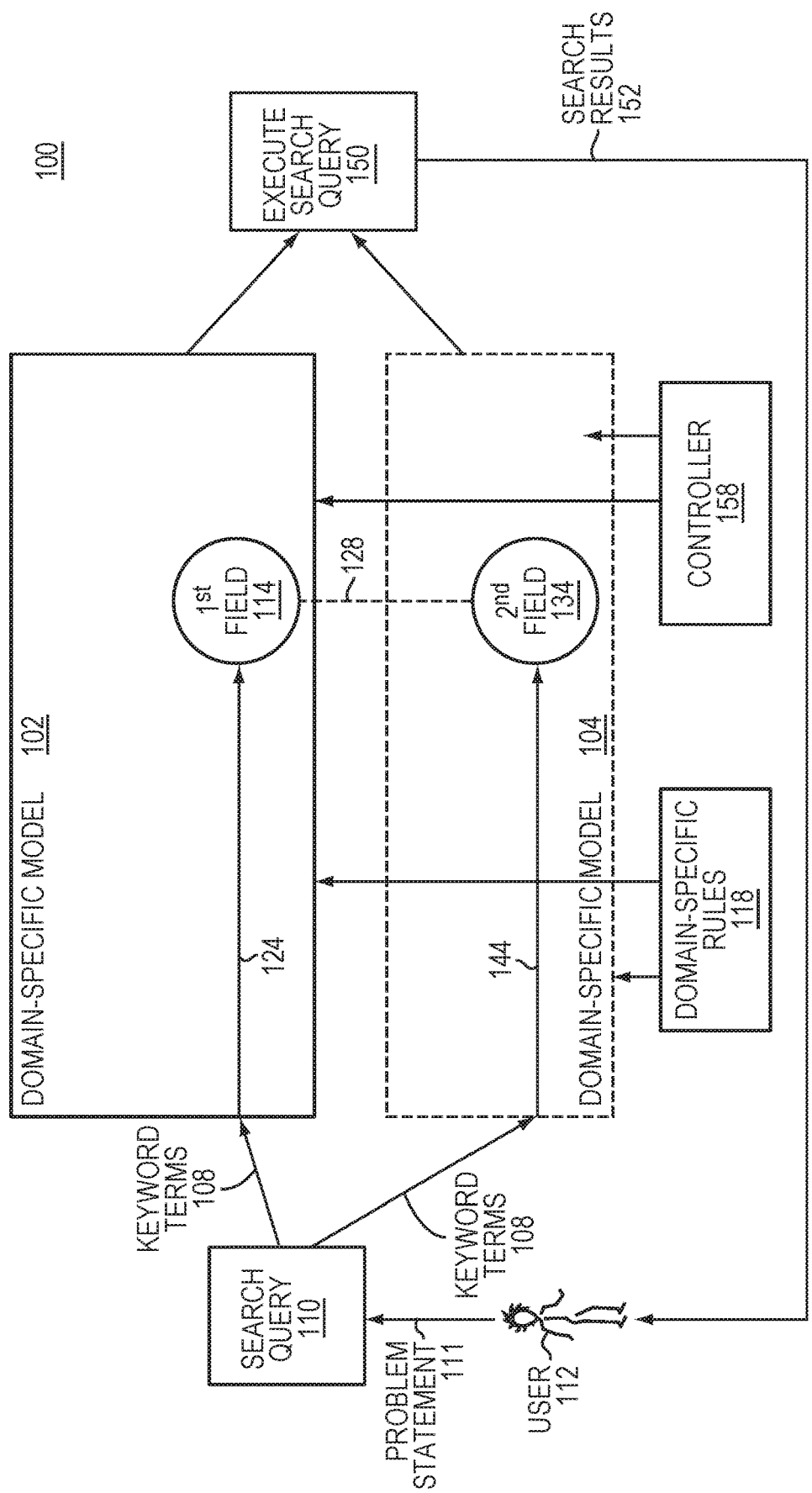

In FIG. 1B, in an embodiment, the first field 114 and second field 134 are in respective first 102 and second 104 domain-specific models, and the controller 158 maps a relationship 128 between a first field 114 of a first reasoned (e.g., inferred) relationship 124 to a second field 134 of a second reasoned (e.g., inferred) relationship 144.

Figure 1C:
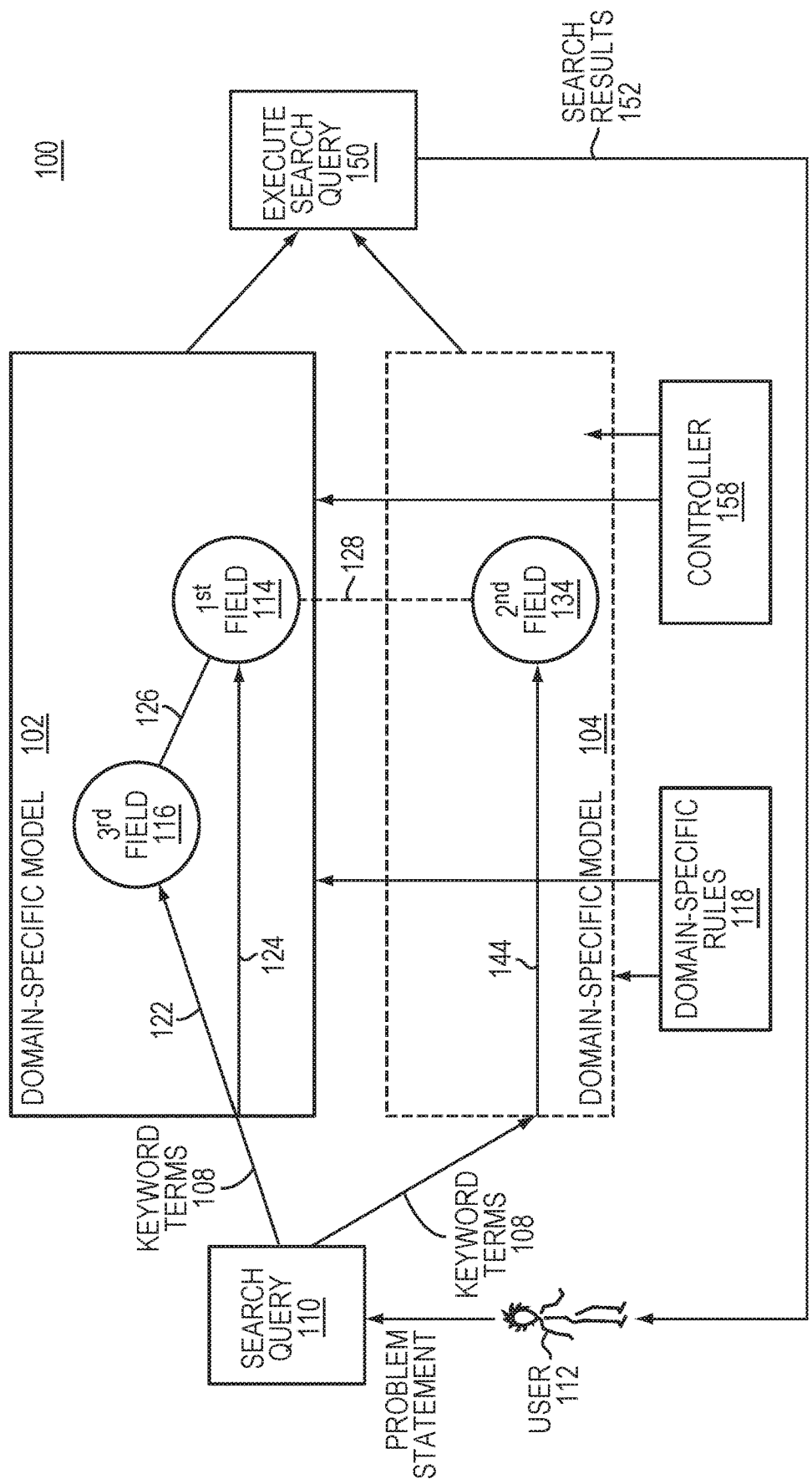

In FIG. 1C, in an embodiment, the first field 114 and a second field 134 are in respective first 102 and second 104 domain-specific models, and controller 158 maps a first field 114 of a first reasoned (e.g., inferred) relationship 124 to a second field 134 of a second reasoned (e.g., inferred) relationship 144. As illustrated in FIG. 1C, an advantage of some embodiments is that the system may perform mapping both within a domain-specific model 102 and between domain-specific models 102 and 104.

As illustrated in FIGS. 1A-C, the controller 158 executes the search query 110 based on one or more of the mappings 126 or 128. The execution of the search query 150 generates one or more search results 152 that are presented to the user 112. In executing the search query 150, the controller 158 may identify documents in a data repository associated with the inputted keyword terms 108 along at least one path 122, 124, 126, 128, or 144 of the one or more domain-specific models 102, 104 based on one or more of the mappings 126, 128.

In an embodiment, the controller 158 (and the system, method, and computer program product map herein) maps subsequent reasoned (e.g., inferred) relationships from an Nth reasoned (e.g., inferred) relationship to an (N+1)th reasoned (e.g., inferred) relationship.

Figure 2:
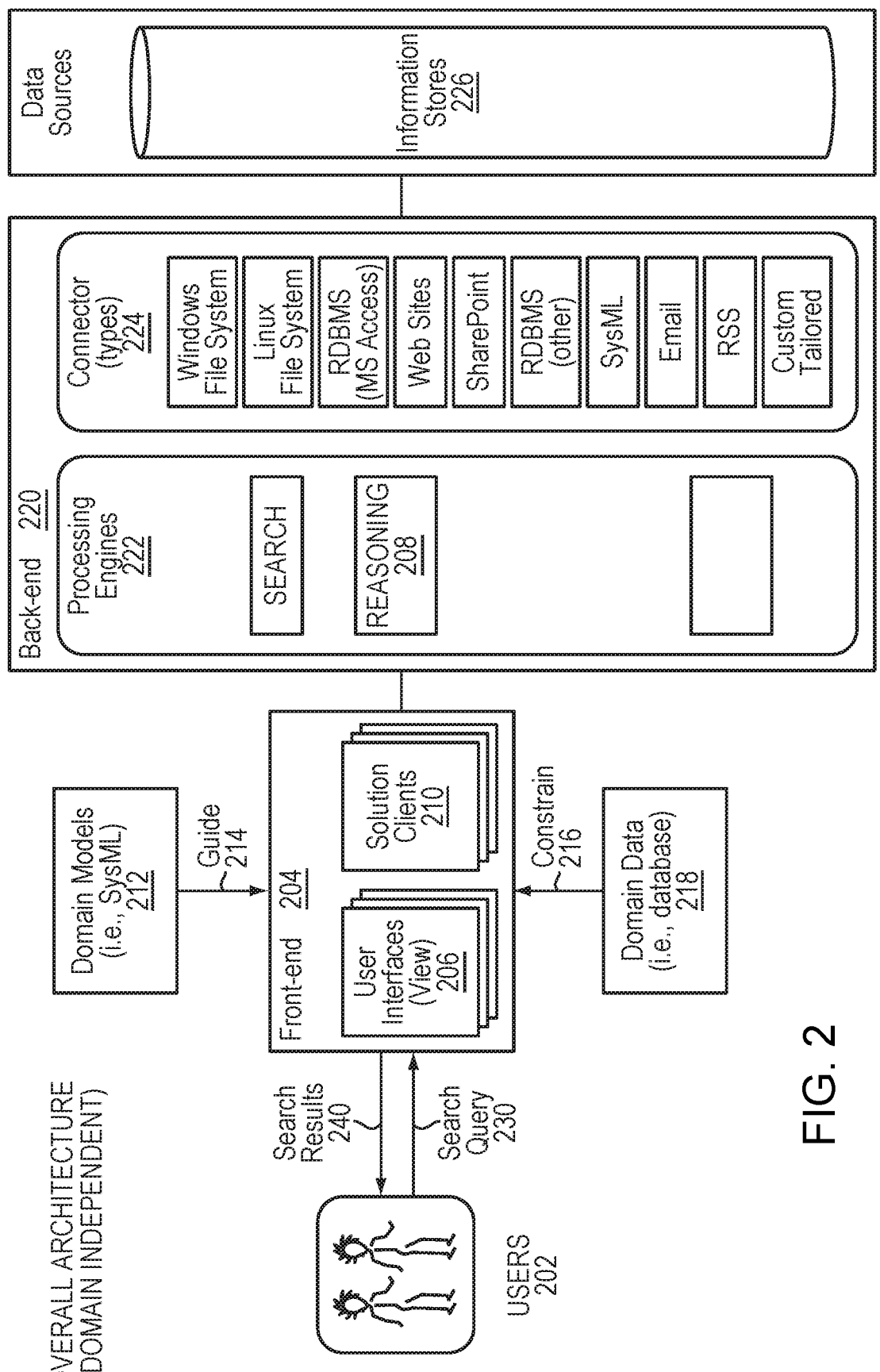

FIG. 2 is a high-level block diagram illustrating example embodiments of a system 200 employed by the present disclosure. The system 200 may include front-end processing 204, back-end processing 220, and any other processing known to one skilled in the art to perform its intended functions including but not limited to including reasoning (e.g., inferencing or inferring) relationships, mapping the reasoned (e.g., inferred) relationships, executing the search query, and generating search results.

The system 200 may include one or more domain-specific models 212. Some embodiments employ one or more models that represent one or more aspects of one or more domains of interest. Some embodiments include one or more representations of virtual or physical aspects of one or more domains. Embodiments employ models that represent one or more aspects of one or more domains of interest. In an embodiment, a domain-specific model is a Human-as-a-System (HaaS) Model. However, other types of domain-specific models can be employed, such as models that represent one or more aspects of the domain of interest (e.g., a dynamics model, MATLAB model, Car-as-a-system (CaaS) model, Business-as-a-System (BaaS) model, a heuristic model, or any other model known to one skilled in the art). Embodiments are not limited to models of a system.

In an embodiment, a memory or data repository can store the domain-specific models 212. In an embodiment, a user 202 or other module or system may provide or guide 214 the domain-specific models 212 to the reasoning engine (inference engine) 208. The domain-specific models 212 may guide 214 the reasoning engine (inference engine) 208 to perform reasoning.

Using one or more user interfaces 206, a user 202 may input a search query 230 that includes one or more keyword terms. Each of the plurality of relationships mentioned above is between a keyword term of the search query 230 inputted by the user 202 via the user-interface 206 and a field of the domain-specific model 212.

For a respective domain-specific model 212 of one or more domain-specific models 212, the reasoning engine (inference engine) 208 may infer a plurality of relationships within a respective domain-specific model 212. The reasoning engine (inference engine) 208 may perform reasoning (e.g., inferencing or inferring) by using one or more processing engines 222 or solution clients 210 to perform functions including but not limited to search, reasoning, inferring, analytics, machine learning, and other engine functions.

The reasoning engine (inference engine) 208 reasons (e.g., infers) the plurality of relationships by traversing the domain-specific model 212 according to domain-specific rules. The reasoning engine (inference engine) 208 selects domain-specific rules based upon the inputted keyword terms of the search query 230. In an embodiment, the domain-specific rules include one or more constraints 216 provided by a configuration data repository 218. In an embodiment, the user 202 or the configuration data repository 218 provides one or more of the domain-specific rules.

Then, the reasoning engine (inference engine) 208 maps a first field of a first reasoned (e.g., inferred) relationship to a second field of a second reasoned (e.g., inferred) relationship. The first field and second field are in respective first and second domain-specific models 212.

Next, the processing engines 222 execute the search query 230 based on the mapping. With the aid of connectors 224, the processing engines 222 accesses the information to be searched which resides in one or more information stores (or data sources) 226.

The processing engines 222 execute the search query 230 based upon their access to the information to be searched 226. By executing the search query 230, the processing engines 222 generate one or more search results 240 and forward these search results 240 through the front-end module 204 to the user 202.

Figure 3A:
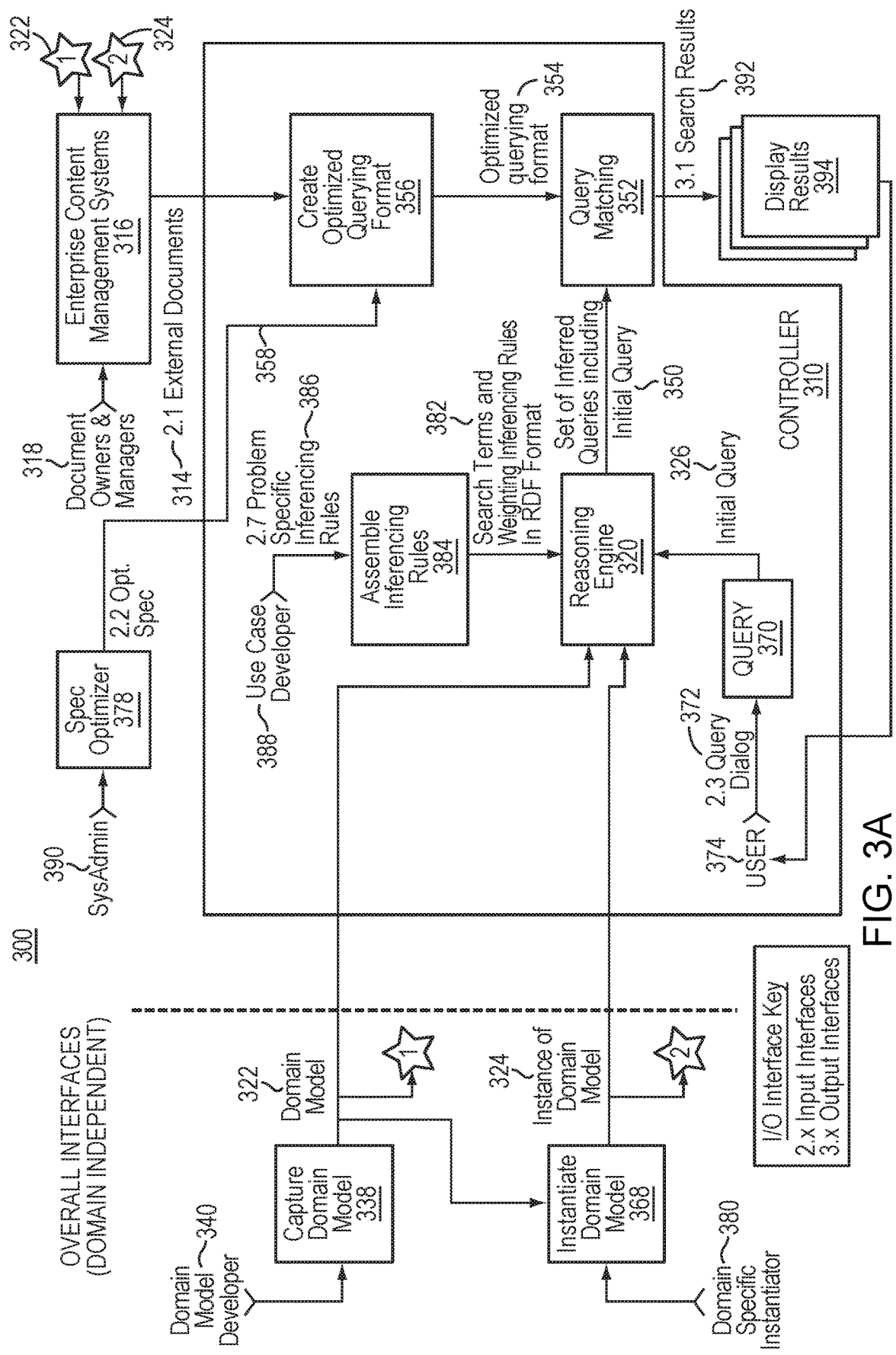
Figure 3B:
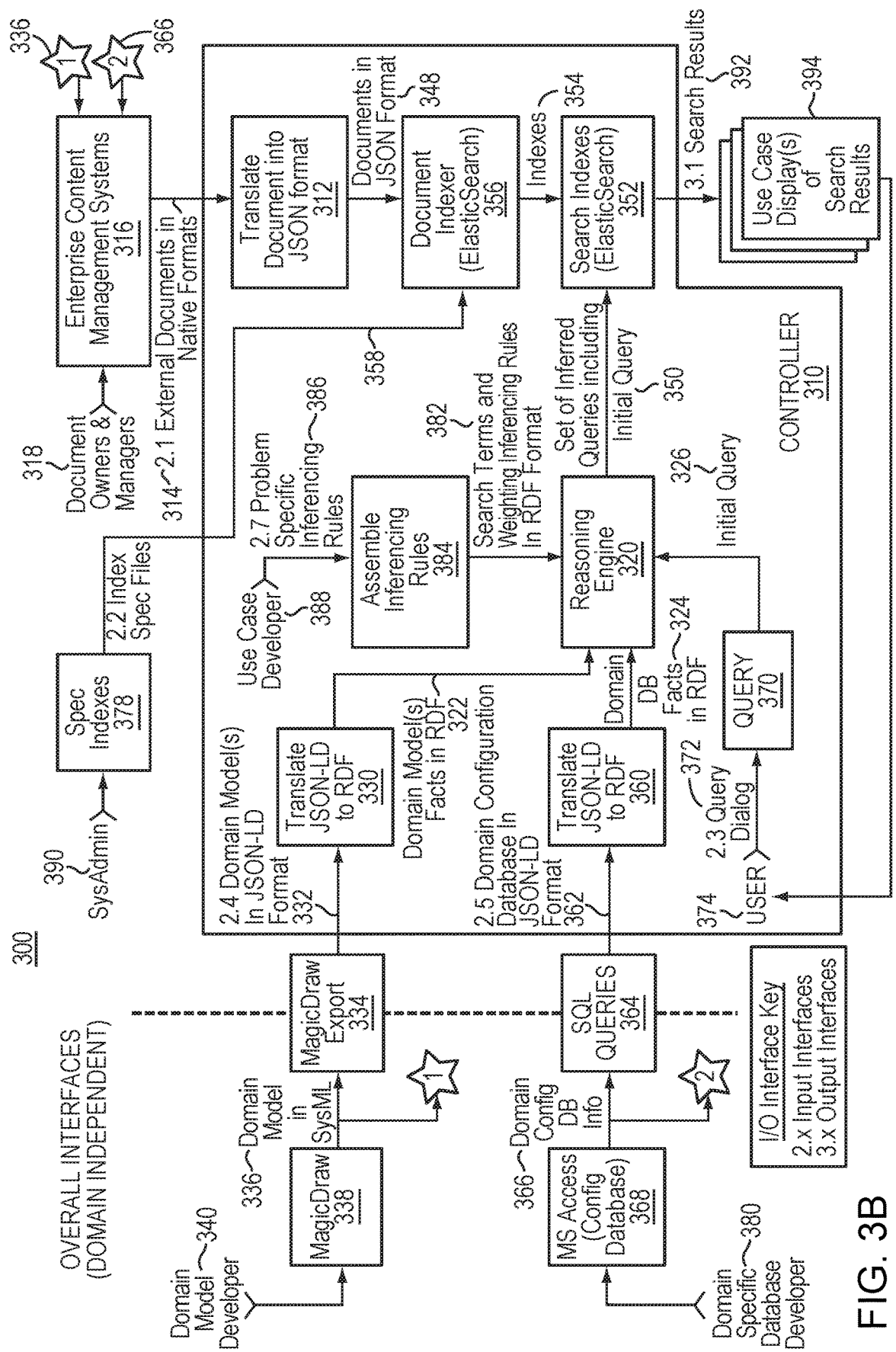
Figure 3C:
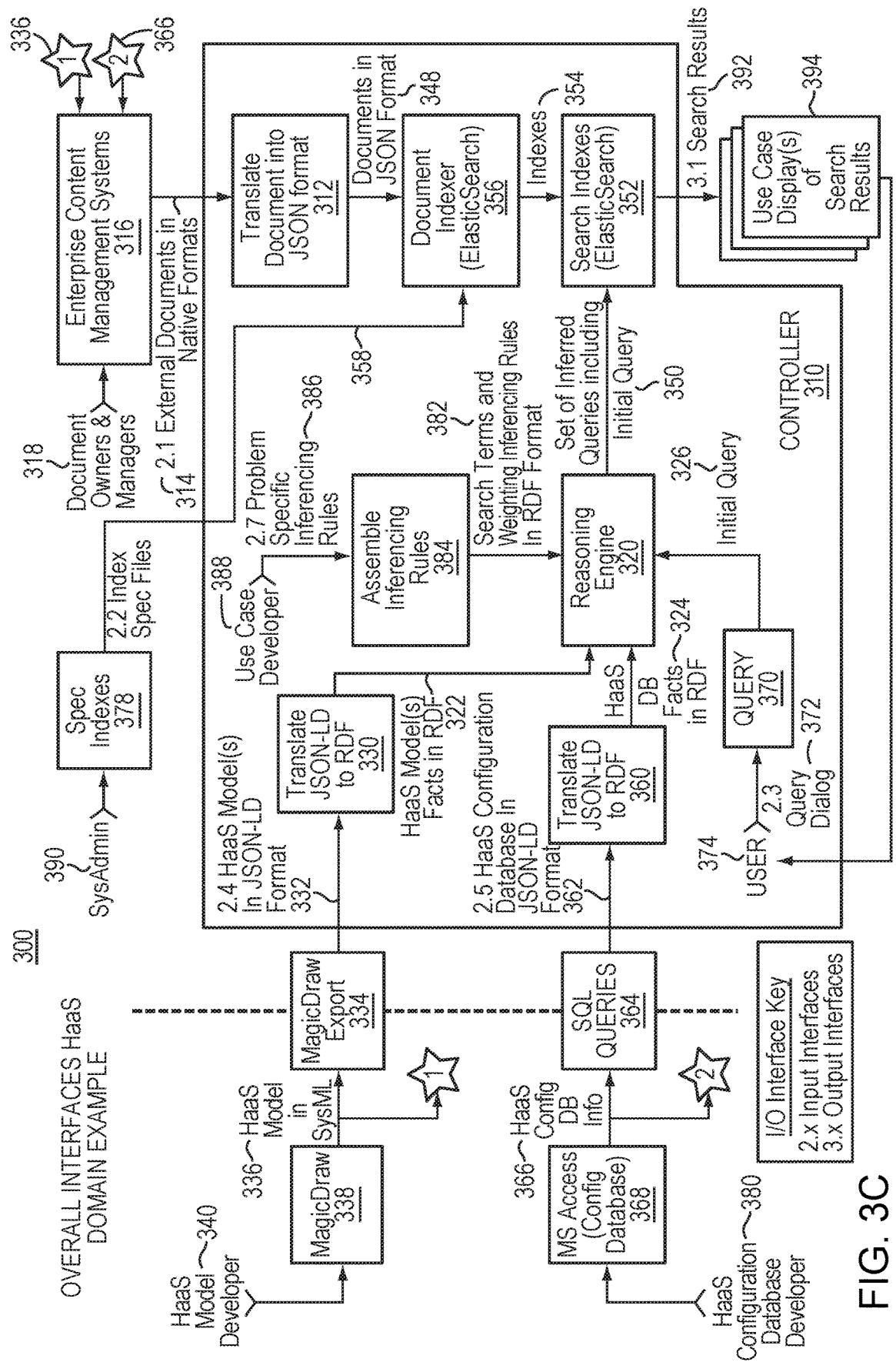

FIGS. 3A-C are high-level block diagrams illustrating example embodiments of a system 300 employed by the present disclosure. FIG. 3A illustrates a domain-independent system 300 without the need for translation components. FIG. 3B is a domain-independent system 300 with translation components. FIG. 3C is a domain-specific example of the generic domain-independent system 300 of FIG. 3B.

As illustrated in FIGS. 3A-C, the system 300 may include a controller 310, and any other processing known to one skilled in the art to perform its intended functions including but not limited to including reasoning (e.g., inferencing or inferring) relationships, mapping the reasoned (e.g., inferred) relationships, executing a search query, and generating search results. As illustrated in FIG. 3A-C, the controller 310 may include a reasoning engine (inference engine) 320 that receives one or more domain-specific models 322.

As illustrated in FIGS. 3A-C, a user 340 may capture a domain model through a model development tool 338. The model development tool 338 may include but is not limited to including MAGICDRAW or any model development tool known to one skilled in the art that represents one or more aspects of one or more domains of interest.

As illustrated in FIG. 3A, the model development tool 338 may provide the domain-specific model 322 directly to the reasoning engine 320.

Similarly, as illustrated in FIGS. 3B-C, a model translation engine 330 may forward one or more domain-specific models 332 to the reasoning (inference) engine 320. The model translation engine 330 may receive one or more domain-specific models 332 through a model development export engine 334 that receives one or more domain-specific models including but not limited to SYSML models 336 from a model development tool 338 that takes input from a model developer 340.

As illustrated in FIGS. 3A-C, the reasoning engine (inference engine) 320 may receive domain database information or an instance of a domain model 324. The reasoning engine (inference engine) 320 receives query information 326 from a query engine 370. The reasoning engine (inference engine) 320 receives keyword search terms and weighted reasoning (e.g., inferencing or inferring) rules 382 from a rule assembly engine 384.

As illustrated in FIGS. 3A-C, the query engine 370 may receive a user query dialog 372 from a user 374. The rule assembly engine 384 receives reasoning (e.g., inferencing or inferring) rules 386 from a use case developer 388. In another embodiment, the rule assembly engine 384 automatically provides or determines reasoning (e.g., inferencing or inferring) rules 386 or the rule assembly engine 384 obtains the reasoning (e.g., inferencing or inferring) rules 386 from data repository information 366 without the need for input by a use case developer 388.

In FIG. 3A, a domain specific instantiator 380 may provide the instance of a domain model 324 to the reasoning engine (inference engine) 320 through an instantiated domain model or data repository access tool 368. The instantiated domain model or data repository access tool 368 includes but is not limited to Microsoft Access™.

Similarly, in FIGS. 3B-C, the reasoning engine (inference engine) 320 may receive database information 324 from a configuration engine 360. The configuration engine 360 may receive and translate configuration information 362 from one or more queries including but not limited to including SQL queries 364 provided by a configuration data repository 366 through a data repository access tool 368 that includes but is not limited to Microsoft Access™. The data repository access tool 368 may receive data repository information or data repository configuration information from a developer 380.

As illustrated in FIGS. 3A-C, for a respective domain-specific model 322 of one or more domain-specific models 322, the reasoning engine (inference engine) 320 may infer a plurality of relationships within the respective domain-specific model 322. The reasoning engine (inference engine) 320 may perform reasoning (e.g., inferencing or inferring) by using one or more processors or processing engines that may be included in or separate from the reasoning engine (inference engine) 320 and may perform functions including but not limited to search, reasoning, inferring, analytics, machine learning, and other engine functions.

Referring back to the user 374, the user 374 may input a search query dialog 372 that includes one or more keyword terms. The respective domain-specific model 322 may include a plurality of relationships. Each of the plurality of relationships is between a keyword term of a search query 326 inputted by a user 374 via a user-interface 372 and a field of the respective domain-specific model 322, between respective fields of the domain-specific model 322, or between respective fields of separate domain-specific models.

As illustrated in FIGS. 3A-C, the reasoning engine (inference engine) 320 may reason (e.g., infers) the plurality of relationships by traversing the respective domain-specific model 322 according to rule information 382 including domain-specific rules 386. The reasoning engine (inference engine) 320 selects domain-specific rules 386 of the rule information 382 based upon the inputted keyword terms of the user query 326. The reasoning engine (inference engine) 320 may receive domain-specific rules in the form of one or more facts or constraints 324 that are translated 360 and provided by a configuration data repository 366 through one or more SQL queries 364.

As illustrated in FIGS. 3A-C, the reasoning engine (inference engine) 320 may map a first field of a first reasoned (e.g., inferred) relationship to a second field of a second reasoned (e.g., inferred) relationship. The first field and second field are in respective first and second domain-specific models 322. The reasoning engine (inference engine) 320 may provide a set of reasoned (e.g., inferred) queries 350 to a search index engine or query matcher 352. The search index engine or query matcher 352 receives one or more search indices 354 from a document indexer or query format optimizer 356. The document indexer or query format optimizer 356 receives one or more index specification files 358 from specification indexes 378 provided by a system administrator 390. The document indexer or query format optimizer 356 also receives one or more documents 314 either directly (as in FIG. 3A) or via a translated format 348 through a translation engine 312 (as in FIGS. 3B-C).

As illustrated in FIGS. 3A-C, one or more content management systems 316 forward the one or more documents 314. The one or more content management systems 316 receive documents from a document owner 318, or from domain model information (336, 366 of FIGS. 3B-C, or 322, 324 of FIG. 3A).

As illustrated in FIGS. 3A-C, the search index engine or query matcher 352 may execute the search query 326 based on the set of reasoned (e.g., inferred) queries 350 provided by the reasoning engine (inference engine) 320. The search index engine or query matcher 352 then generates and presents one or more search results 392 to the user 374 through one or more use case displays 394.

Figure 4:
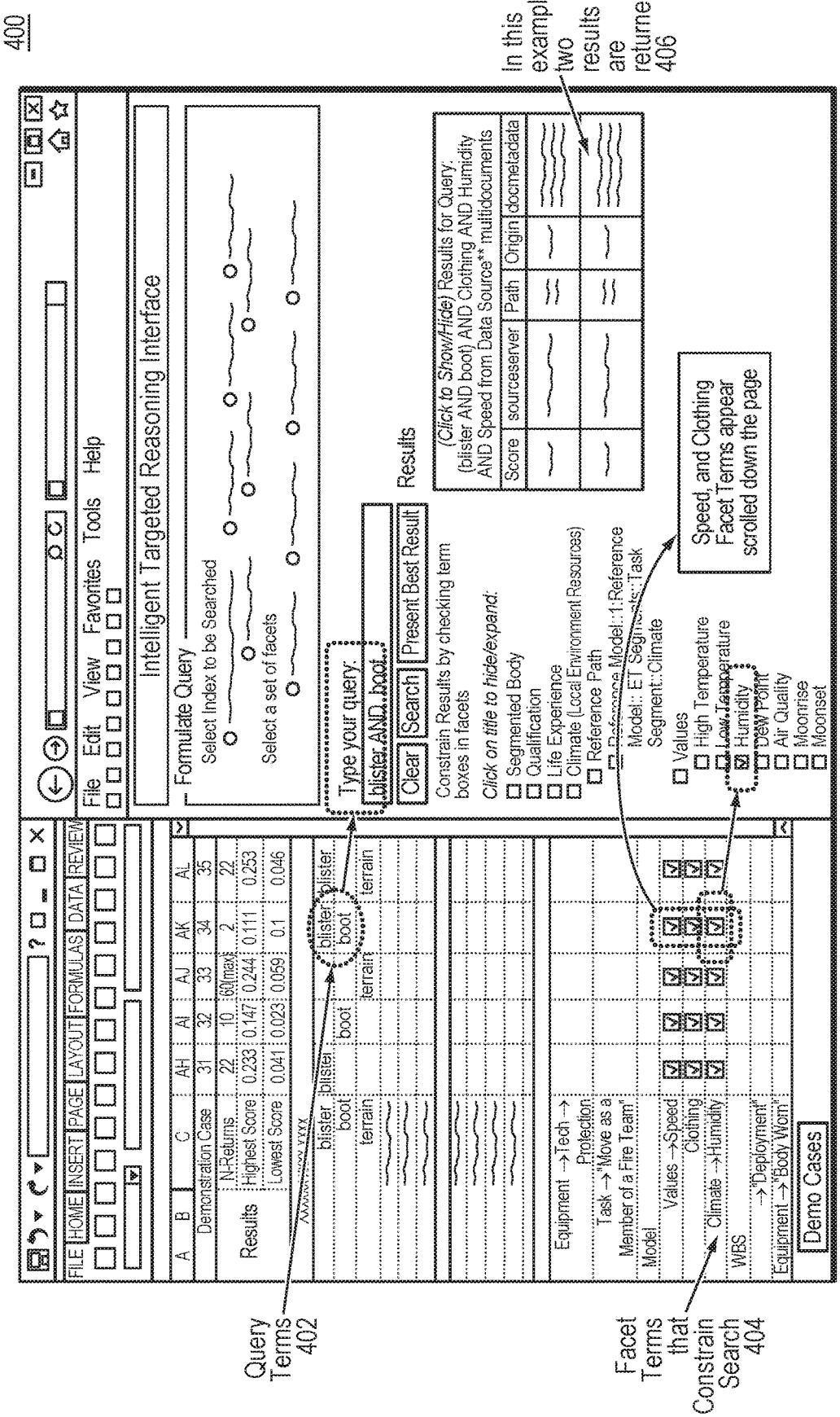
FIG. 4 is a diagram illustrating a user interface that may be used in conjunction with example embodiments employed by the present disclosure.

FIG. 4 illustrates a user interface 400 that may be used in conjunction with embodiments herein. The user interface 400 may receive as input keyword query terms 402 and constraints including facet terms 404. The user interface 400 may output one or more search results 406 to a user.

Figure 5A:
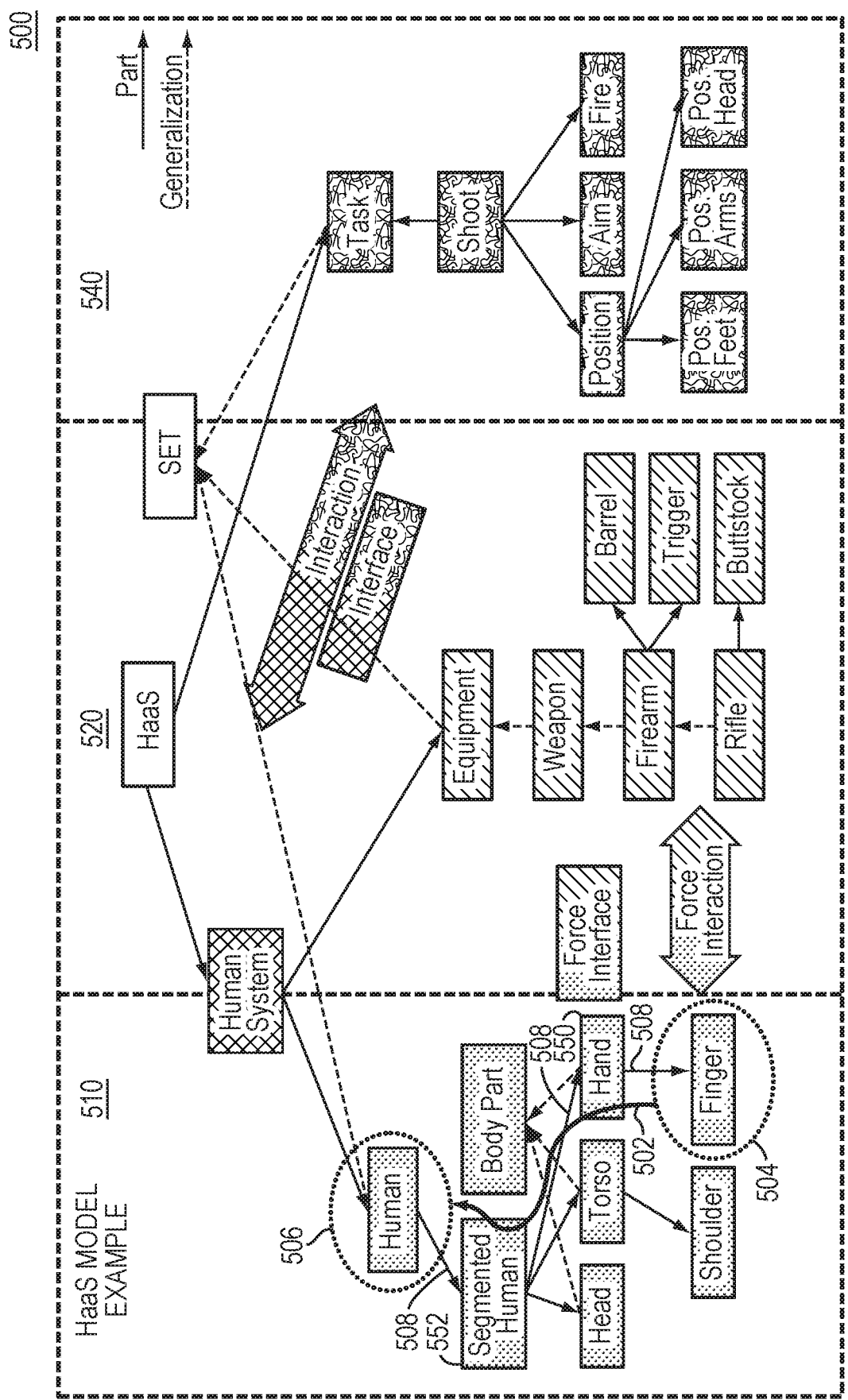
FIGS. 5A-C are diagrams illustrating model traversal in example embodiments of a method employed by the present disclosure.
Figure 5B:
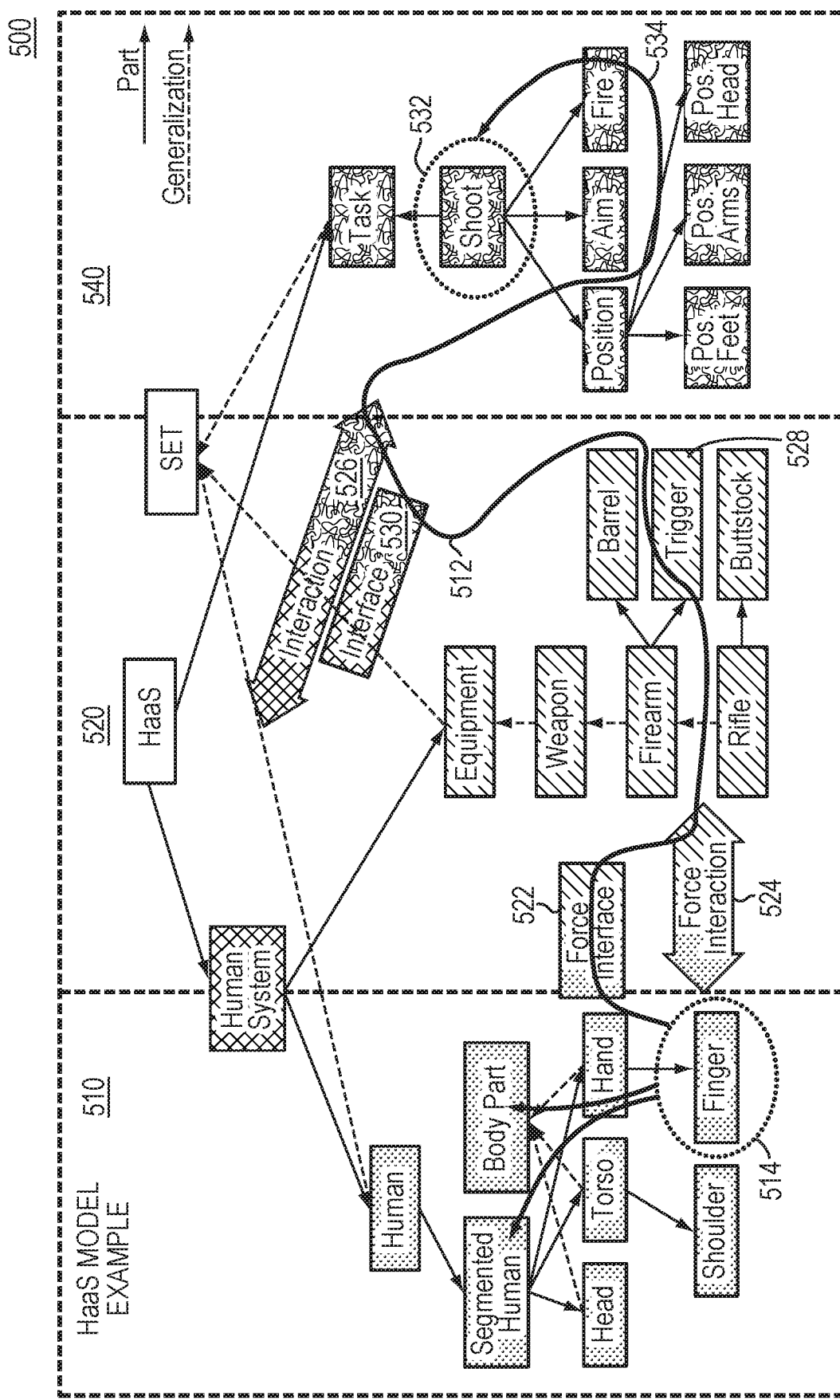
Figure 5C:
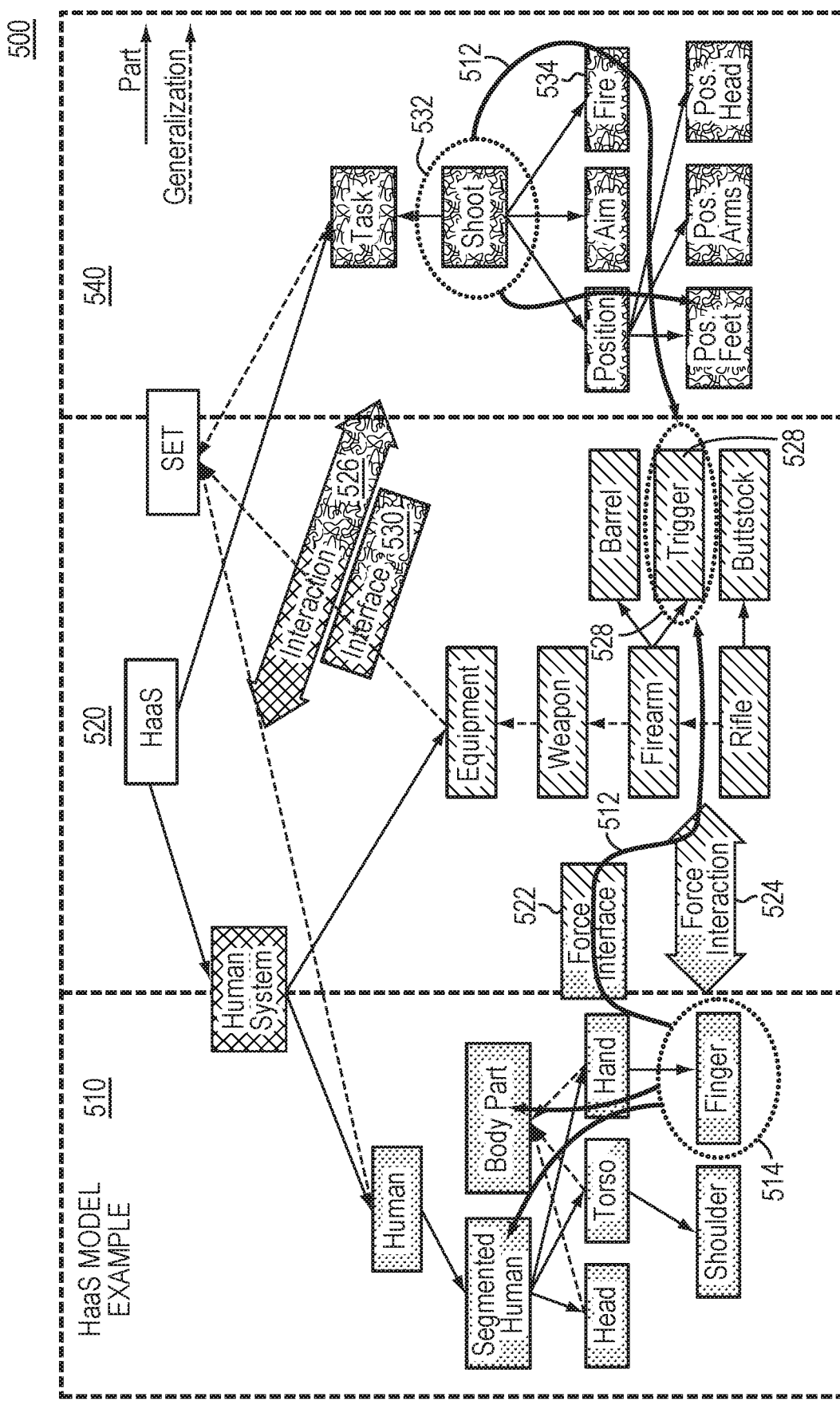

FIGS. 5A-C are diagrams illustrating domain-specific model traversal in example embodiments of a method 500 employed by the present disclosure. As described above, and as illustrated in FIGS. 5A-C, the method 500 reasons (e.g., infers) the plurality of relationships by traversing within a domain-specific model (e.g., intra-model relationship, see FIG. 5A) or between domain-specific models (e.g., inter-model relationship, see FIGS. 5B-C) according to domain-specific rules selected by the inputted keyword terms. A person of ordinary skill in the art can understand that an intra-model relationship is a relationship between fields of the same model and an inter-model relationship is a relationship between fields of different models.

Embodiments include domain-specific models that may have homogeneous or heterogeneous relationships between entities (e.g., components, nodes, parts, or elements) of the domain-specific models. As illustrated in FIGS. 5A-C, embodiments may include one or more such homogeneous (see FIG. 5A) or heterogeneous (see FIGS. 5B-C) relationships. In an embodiment, as shown in FIG. 5A, a homogeneous relationship is defined as a relationship between entities, where the relationships connecting the entities are of the same type (e.g., "is a part of" relationship, or "force interaction" relationship). In an embodiment, as shown in FIGS. 5B-C, a heterogeneous relationship is defined as a relationship between entities, where the relationships connecting the entities are of different types. As such, both intra- and inter-model relationships can be either heterogeneous or homogeneous.

In FIG. 5A, the domain-specific model 510 illustrates that a finger 504 is part of a hand 550, which is part of a segmented human 552, which is part of a human 506. As illustrated in FIG. 5A, the method 500 may perform reasoning (e.g., inferencing or inferring) within a homogeneous set of relationships 508, by traversing 502, across various homogeneous relationships 508 (e.g., all "is a part of"), from one entity, a finger 504, to another entity, a human 506, within a given domain-specific model 510. Such a traversal 502 may be depth-first or vertical in nature, but is not so limited. FIG. 5A also illustrates other domain-specific models 520, 540 described further in FIGS. 5B-C to follow.

As illustrated in FIGS. 5B-C, a heterogeneous set of relationships may include relationships between entities across a plurality of domain-specific models 510, 520, 540.

As illustrated in FIG. 5B, in an embodiment, the method 500 performs an incremental search by examining entity relationships beginning at entity finger 514 until the entity shoot 532 is encountered. As illustrated in FIG. 5B, the method 500 may perform reasoning (e.g., inferencing or inferring) by traversing 512 across a heterogeneous set of relationships. As illustrated in FIG. 5B, finger 514 is related to shoot 532 through part relationships between an interface 522, interaction 524, trigger 528, additional interface 530, additional interaction 526, and fire 534. Specifically, the relationships illustrated by FIG. 5B are heterogeneous because it includes a "force interface," "force interaction," and "is a part of" (e.g., fire is a part of shooting) relationship.

One or more interactions 524, 526 of a user, module, system, or computer-implemented feature, function or procedure may begin (e.g., initiate) the traversal 512. In response to an interaction 524, the method 500 may traverse 512 from one entity 514 across an interface 522 to another entity 528, and then, based on another interaction 526, further traverse 512 through another interface 530, through a further entity 534, to a final destination entity 532.

As illustrated in FIG. 5C, in an embodiment, the method 500 performs a directed search by examining entity relationships beginning at both finger 514 and shoot 532 until a common entity 528 is encountered. As illustrated in FIG. 5C, the entity finger 514 is related to the entity shoot 532 through part relationships between the entities interface 522, interaction 524, trigger 528, and fire 534. As illustrated in FIG. 5C, the method 500 may perform reasoning (e.g., inferencing or inferring) by traversing 512 across a heterogeneous set of relationships from two source entities 514, 532 to one destination entity 528.

One or more interactions 524, 526 of a user, module, system, or computer-implemented feature, function or procedure may trigger (e.g., initiate) the traversal 512. In response to an interaction 524, the method 500 may traverse 512 from a first entity 514 across an interface 522 to a destination entity 528. Based on another interaction 526, the method 500 may traverse 512 from one entity 532 through another entity 534 to the destination entity 528.

Figure 6A:
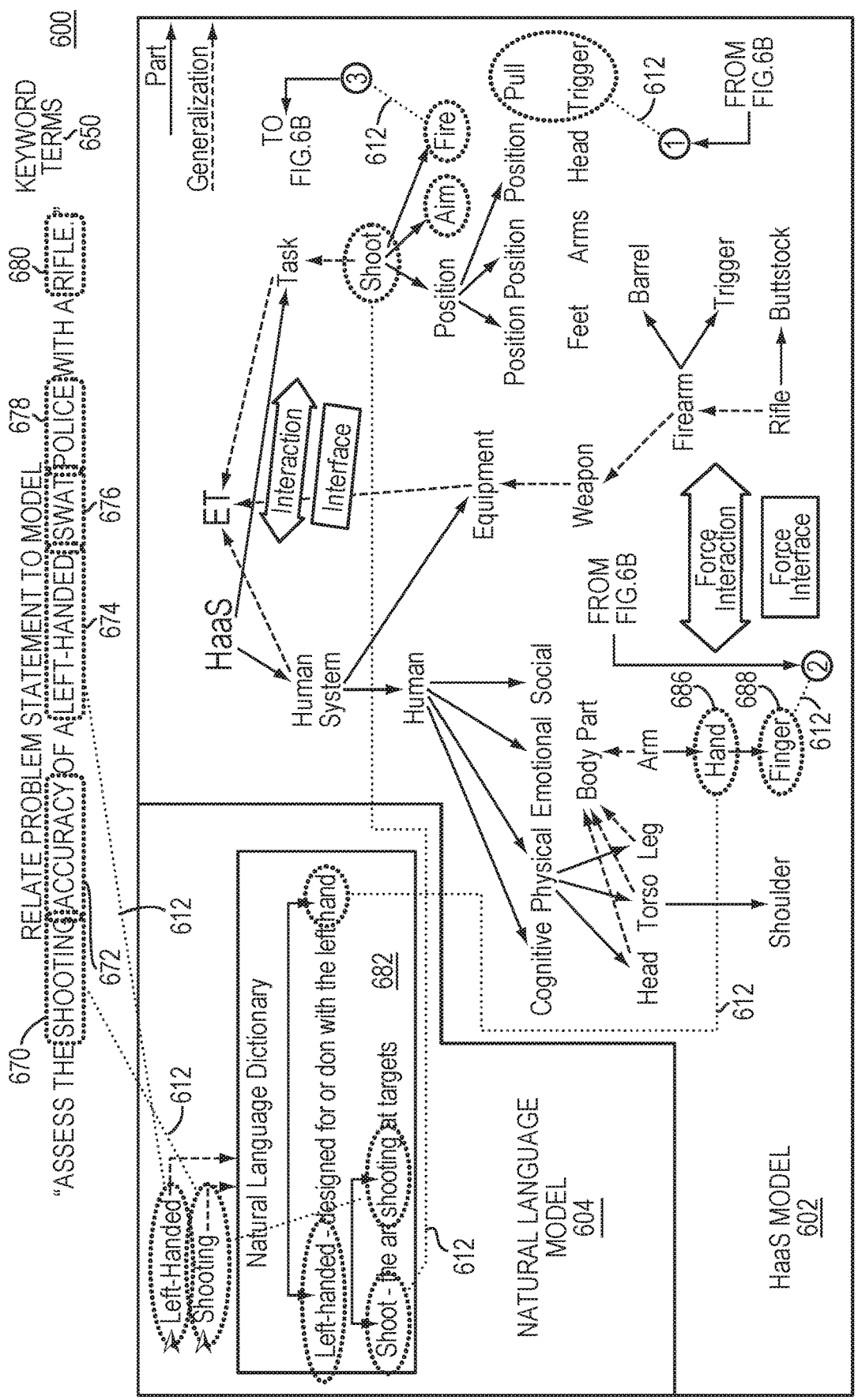
FIG. 6 is diagram illustrating relationships between models in an example embodiment of a method employed by the present disclosure.
Figure 6B:
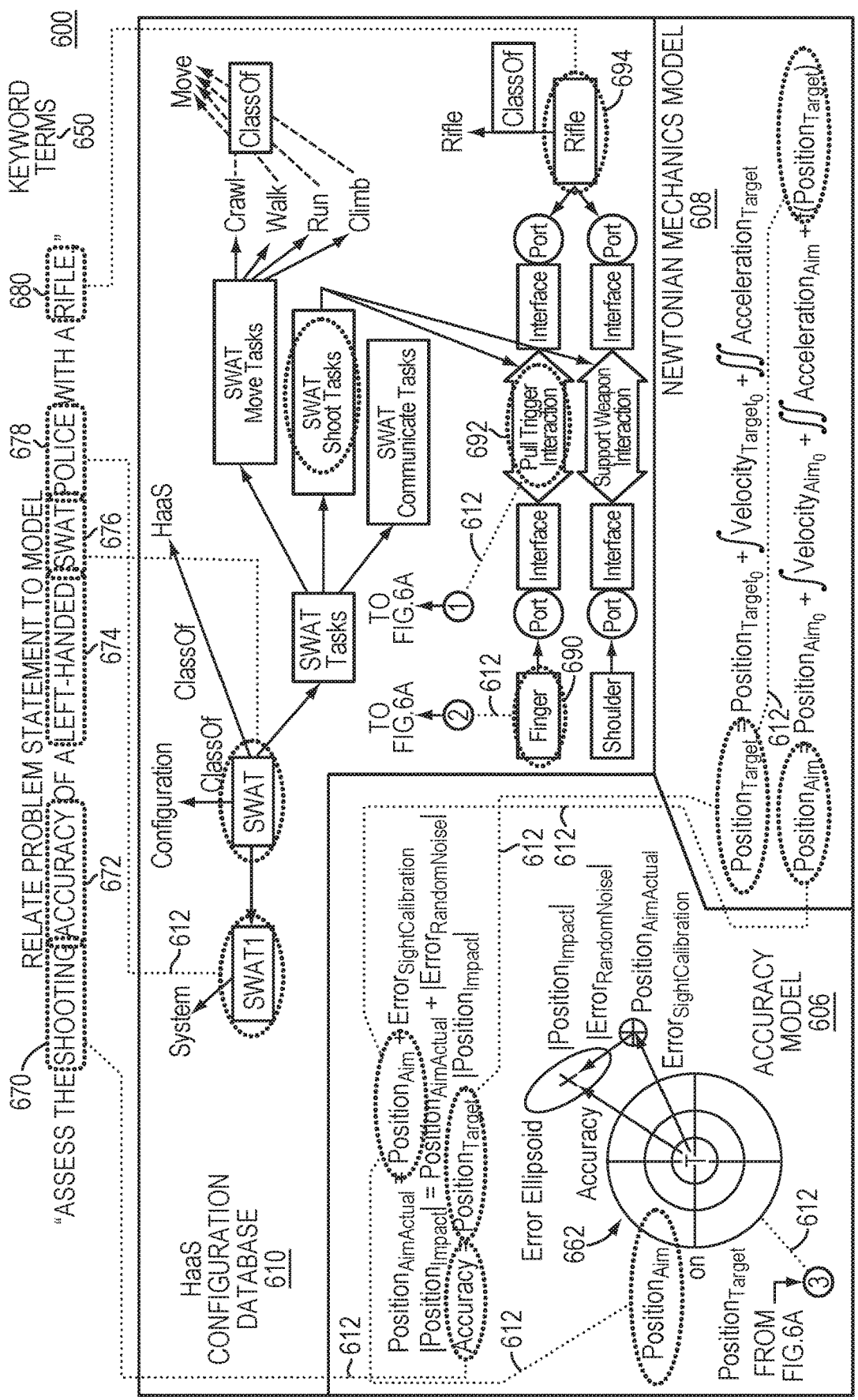

Similarly to FIGS. 5A-C, FIG. 6 is diagram illustrating relationships between domain-specific models in an example embodiment of a method 600 employed by the present disclosure. As illustrated in FIG. 6, the method 600 may perform reasoning (e.g., inferencing or inferring) that includes traversing across two or more domain-specific models 602, 604, 606, 608, 610. The method 600 may perform reasoning (e.g., inferencing or inferring) via the controller 158 of FIGS. 1A-C, the reasoning engine (inference engine) 208 of FIGS. 2A-B, or the controller 310 of FIGS. 3A-B. The method 600 reasons (e.g., infers) a plurality of relationships 612 by traversing the domain-specific models 602, 604, 606, 608, 610 according to domain-specific rules selected by the inputted keyword terms 610.

As illustrated in FIG. 6, in an embodiment, the method 100 can work in conjunction with various models 602, 604, 606, 608, 610 to obtain a set of domain-specific search results that includes relationships between and within such models 602, 604, 606, 608, 610. In FIG. 6, the problem statement 650 includes keywords to assess shooting 670 accuracy 672 of left-handed 674 SWAT 676 police 678 with a rifle 680.

As illustrated in FIG. 6, in an embodiment, the natural language model 604 receives a query and relates words of the query to fields or entities of one of the various models 602, 604, 606, 608, 610. As one example, the system looks up the keywords left-handed 674 and shooting 670 in a natural language dictionary 682. Regarding the term left-handed, the method 600 then reasons (e.g., infers) a relationship 612 between the entity hand 684 of the natural language model 604 and the entity hand 686 of the HaaS Model 602. The HaaS Model 602 then reasons (e.g., infers) a relationship between its finger 688 that is part of the entity hand 686 and the finger 690 of the HaaS configuration data repository model 610. The HaaS configuration data repository model 610 then reasons (e.g., infers) the relationship between its finger 690 and a rifle 694 by an interaction of pulling a trigger 692. By determining these relationships in a domain-specific model, the search can be informed by these related concepts to the search.

In another example, the keyword "accuracy" is related to the accuracy model 606, which includes a formula to find accuracy. Then, the components needed to calculate accuracy can be found from other models, such as the Newtonian Mechanics Model 608, which provides definitions of $Position_{Target}$ and $Position_{Aim}$. The accuracy model is further related to the "Fire" entity of the HaaS model 602.

Other relationships 612 between the various models 602, 604, 606, 608, 610 are also illustrated in FIG. 6.

In an embodiment, the method 600 of FIG. 6 is automated or links to word processing tools including but not limited to MICROSOFT WORD or other word processing tools known to those skilled in the art, so that the method 600 auto-generates domain specific results, as a user forms sentences such as the sentence 650 of keyword terms in FIG. 6. As such, embodiments may provide Content Sensitive Help or Content Sensitive Guidance.

Figure 7A:
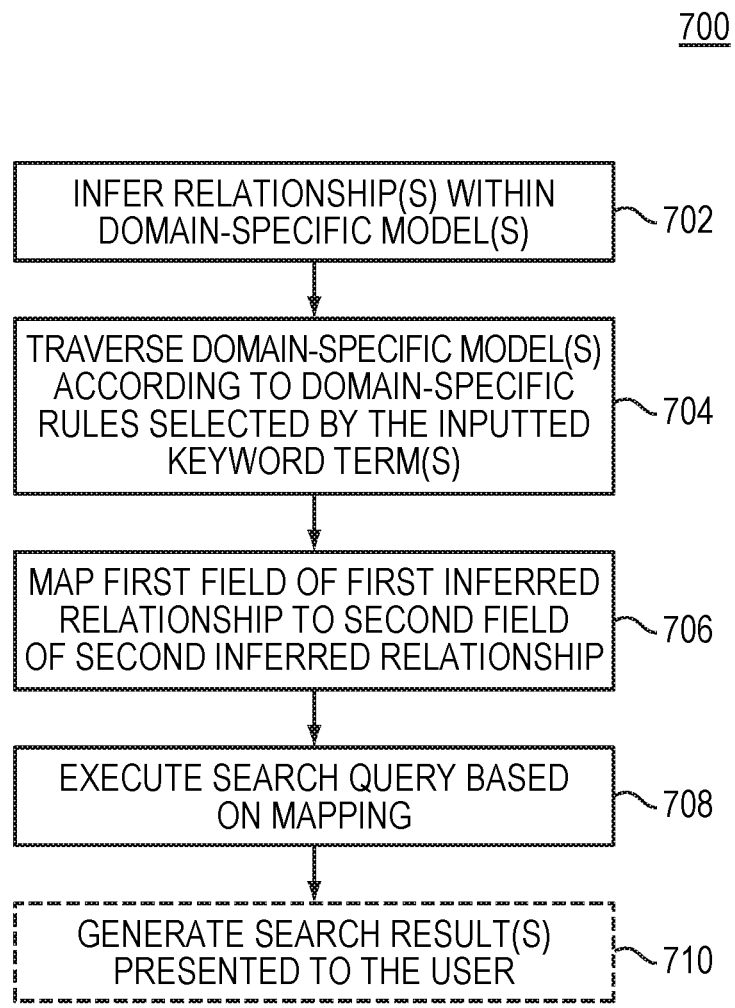
FIG. 7A is a flow diagram illustrating an example embodiment of a method of the present disclosure.

FIG. 7A is a flow diagram illustrating an example embodiment of the present disclosure. As illustrated in FIG. 7A, in an embodiment, a method 700, for a respective domain-specific model of one or more domain-specific models, reasons (e.g., infers) a plurality of relationships within the respective domain-specific model (702). Each of the plurality of relationships is between a keyword term of a search query inputted by a user and a field of the domain-specific model. The method 700 reasons (e.g., infers) the plurality of relationships by traversing the domain-specific model according to domain-specific rules selected by the inputted keyword terms (704). The method 700 maps a first field of a first reasoned (e.g., inferred) relationship to a second field of a second reasoned (e.g., inferred) relationship (706). The first field and second field are in respective first and second domain-specific models. The method 700 executes the search query based on the mapping (708). By executing the search query, the method 700 generates one or more search results presented to the user (710).

Figure 7B:
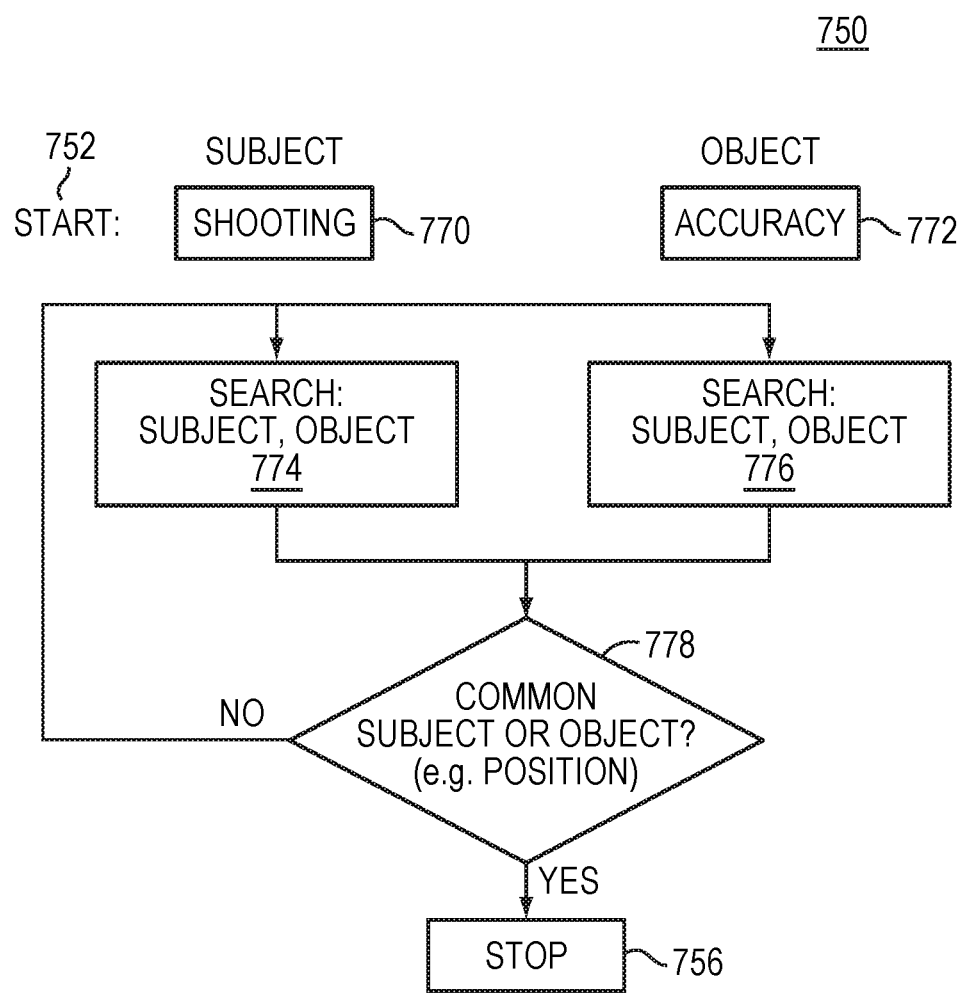
FIG. 7B is another flow diagram illustrating an example embodiment of a method of the present disclosure.

FIG. 7B is another flow diagram illustrating an example embodiment of a method 750 of the present disclosure. In an embodiment, the method 750 of FIG. 7B corresponds to the method 600 of FIG. 6. The method 750 reasons (e.g., infers) a plurality of relationships by traversing domain-specific models according to domain-specific rules selected by the inputted keyword terms 770, 772. In an embodiment, method 750 of FIG. 7B performs a directed traversal of entities (e.g., directed search) from end points 770, 772 to find a common ancestor 778.

As illustrated collectively between FIG. 6 and FIG. 7B, the method 750 initiates 752 a traversal based upon input keyword terms shooting 770 (corresponding to input keyword term shooting 670 of FIG. 6) which is a subject, and input keyword term accuracy 772 (corresponding to input keyword term 672 of FIG. 6) which is an object. In an embodiment, the method 750 performs traversal iteratively 774 based on the first keyword term shoot 770. In parallel or simultaneously with the first traversal 774, the method 750 performs another iterative traversal 776 based upon the second keyword term 772, until the method 750 finds a common subject or object 778. When the method 750 finds a common subject or object, such as position 778, corresponding to position 662 of the accuracy model 606 of FIG. 6, the method 750 ends 756 the traversal.

Embodiments include various modes of operation described to follow which function independently (e.g., individually) or in one or more combinations of modes without limitation.

Standard Mode

In an embodiment, the system, method, and computer program product operate in a standard mode to identify documents in a data repository associated with the inputted keyword terms along at least one path of the one or more domain-specific models based on the mapping.

Other Modes

However, according to embodiments, various modes can be used to search for information in as identified in a reference document including one or more of the following modes: (1) a mode that retrieves a fact or facts; (2) a mode that converges on an improved understanding of a concept; (3) a mode that diverges on a topic by exploring or expanding on a concept; (4) a mode that evaluates a concept; and (5) a combination of any of modes (1), (2), (3), or (4).

In an embodiment, the system, method, and computer program product operate in an (2) convergence mode.

In some embodiments, reasoning (e.g., inferencing or inferring) is performed on fact bases. Fact bases may include statements of facts and rules. New fact statements, that are previously unstated, are derived from a set of stated facts and rules. Statements of fact include one or more of the following factors: (a) a subject, (b) a verb, and (c) a predicate. The reasoning engine (e.g., inference engine or inferencing engine) described herein may maintain facts or rules in various forms and representations of these factors.

Mode 1—Retrieve Fact on a Topic:

In an embodiment, the system, method, and computer program product operate in a (1) fact lookup mode to find one or more facts associated with the inputted keyword terms based on the mapping.

In an embodiment, the (1) fact lookup mode may return direct, explicit facts on a topic. In an embodiment, specific facts on a topic are known to exist within one or more source documents residing at one or more information sources or data repositories. In an embodiment, specific facts exist but not in sources or data repositories. In an embodiment, specific facts are known not to exist and verification is performed to seek to substantiate an argument.

Mode 2—Converge on a Topic

In an embodiment, the system, method, and computer program product (2) identify one or more convergent paths within the one or more domain-specific models associated with the inputted keyword terms.

In an embodiment, the system, method, and computer program product converge on a set of facts that are relevant to a well-stated topic. In an embodiment, initially the topic is broadly or coarsely stated. Relationships may be defined within the domain-specific models and are exploited to (recursively) guide the formulation of refined topic statements. Relationships may be defined within the configuration data repository and are exploited to (recursively) constrain the formulation of refined topic statements. Terms and Statements in Source Documents are exploited to (recursively) formulate topic statements.

Mode 3—Diverge on a Topic

In an embodiment, the system, method, and computer program product (3) identify one or more exploration paths within the one or more domain-specific models associated with the inputted keyword terms.

In an embodiment, the system, method, and computer program product operate in an (3) exploration mode to postulate an analysis mode defining a domain-specific problem associated with the inputted keyword terms. The system, method, and computer program product assign one or more values to the postulated analysis mode. The system, method, and computer program product compare one or more values associated with the postulated analysis mode.

In an embodiment, the system, method, and computer program product expand and recursively explore a topic into directly or indirectly related topics. Relationships are defined within the domain-specific models and are exploited to (recursively) guide the formulation of refined topic statements. Relationships are defined within the configuration data repository and are exploited to (recursively) constrain the formulation of refined topic statements. Terms and statements in source documents are exploited to (recursively) formulate topic statements.

In an embodiment, initially a topic is weakly or poorly stated. In an embodiment, there is a need to acquire facts that are directly or indirectly related to a topic in order to better or more strongly formulate topic Statements. Facts may reside in source documents. A topic may be well-stated initially. In an embodiment, there is a need to identify topics that are related to a well-stated topic.

Mode 4—Evaluate on a Topic

In an embodiment, the system, method, and computer program product (4) identify one or more comparative evaluations of findings along paths within the one or more domain-specific models associated with the inputted keyword terms.

In an embodiment, the system, method, and computer program product compare and contrast measures among topics. In an embodiment, there is a need to evaluate topics. Metrics on topics may exist in one or more source documents. Measures on topics may exist in one or more source documents. Evaluations may be formulated to compare and contrast measures of topics. If one set of metrics and measures exist for one returned topic, a search statement may include a baseline set of metrics and measures with which comparison and contrasting evaluations are made.

Mode 5—Combination

In an embodiment, the system, method, and computer program product operate in one or more of Modes 1-4. An embodiment may include explorations of topic depth, where termination conditions on depth explorations are specified. An embodiment may include explorations of topic breadth, where termination conditions on breadth explorations are specified. An embodiment may include branching conditions for diverging on a topic. An embodiment may include bounding conditions for converging on a topic.

Figure 8:
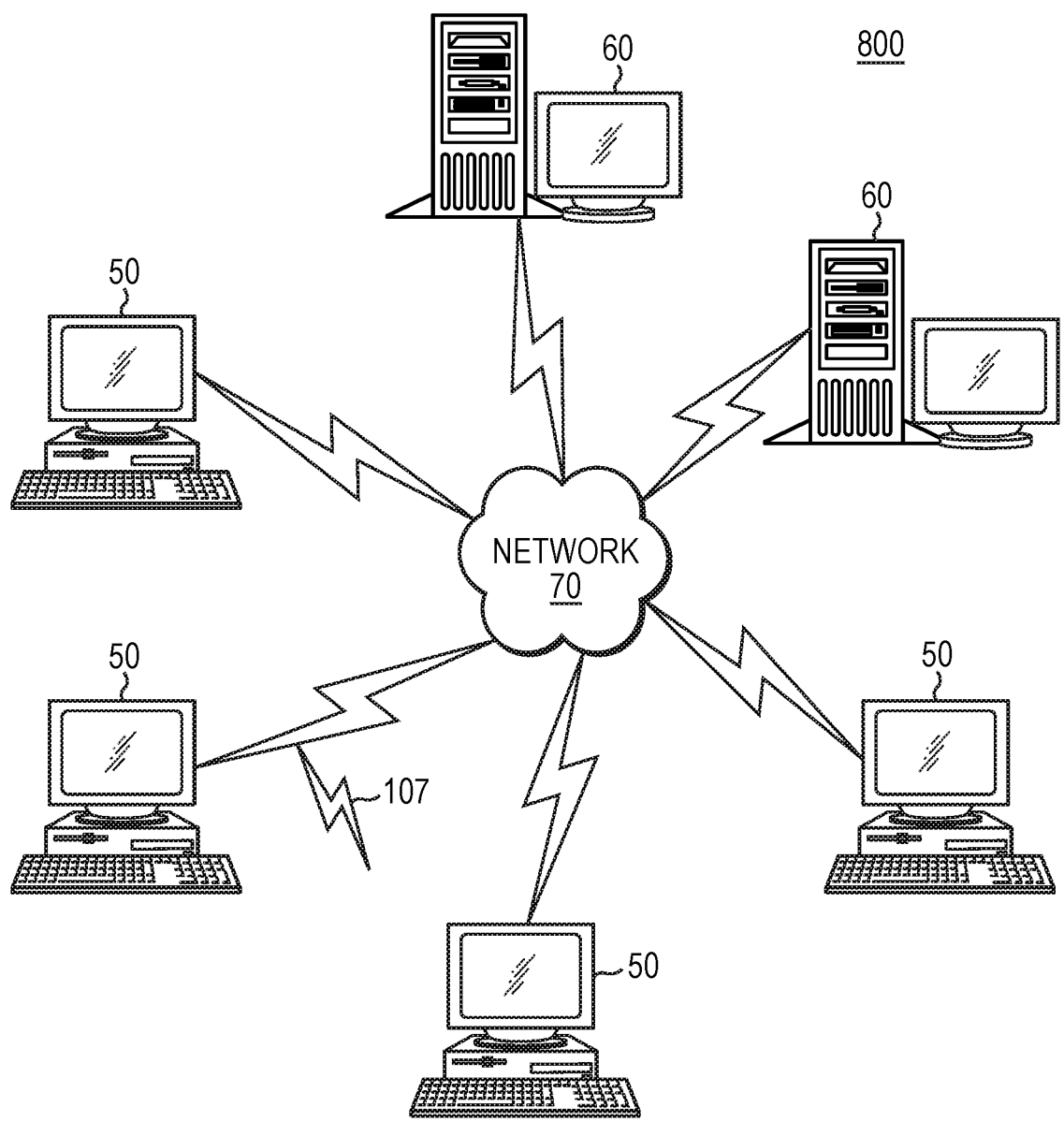
FIG. 8 illustrates a computer network or similar digital processing environment in which embodiments of the present disclosure may be implemented.

FIG. 8 illustrates a computer network or similar digital processing environment 800 in which embodiments of the present disclosure may be implemented. Client computer(s)/devices 50 (e.g., computing devices/display devices) and server computer(s) 60 (e.g., a Cloud-based service) provide processing, storage, and input/output devices executing application programs and the like. The client computer(s)/devices 50 (e.g., computing devices/display devices) can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, BLUETOOTH™, etc.) to communicate with one another. Other electronic device/computer network architectures are suitable.

Figure 9:
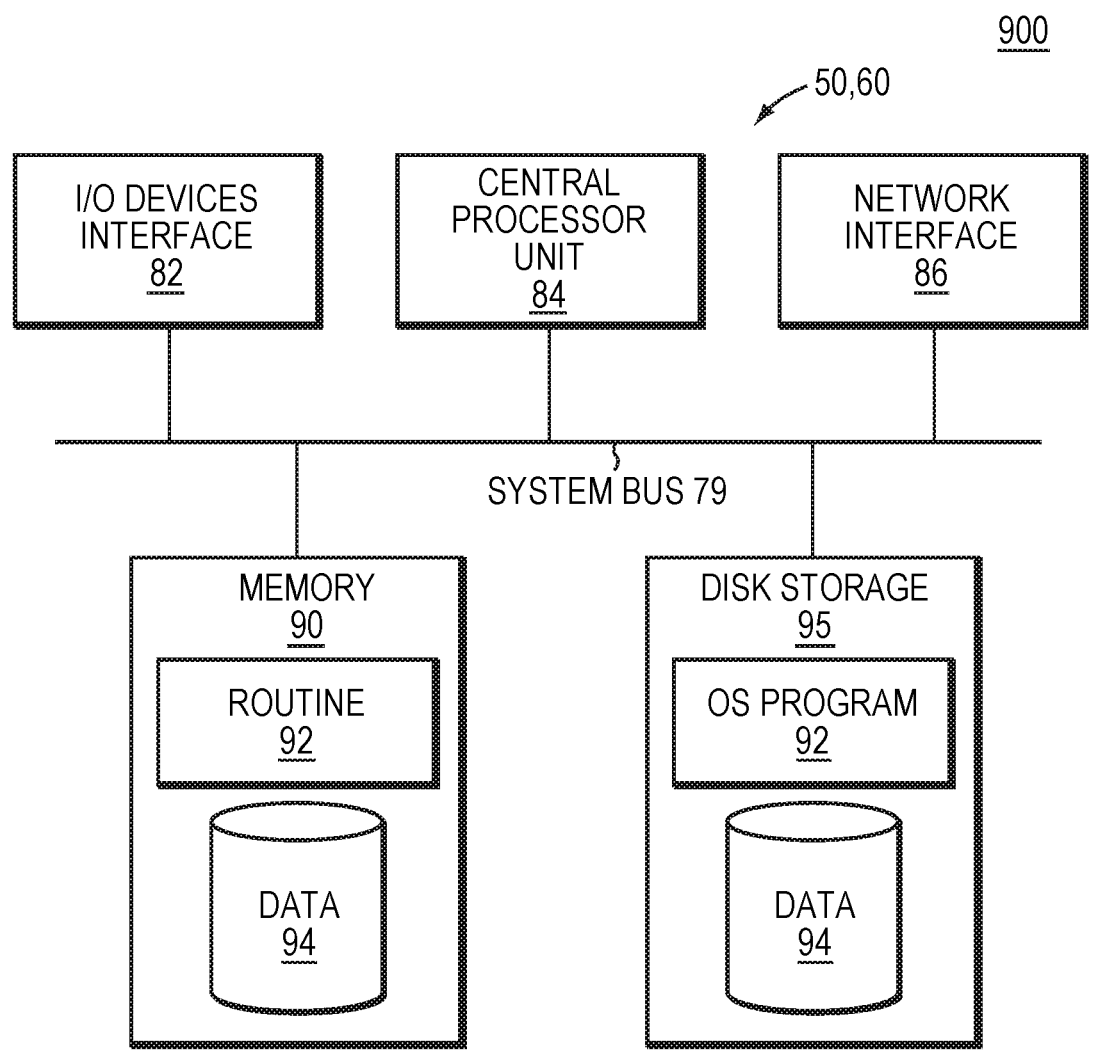
FIG. 9 is a diagram of an example internal structure of a computer (e.g., client processor/device or server computers) in the computer system of FIG. 8, according to some embodiments.

FIG. 9 is a diagram of an example internal structure of a computer (e.g., client processor/device 50 or server computers 60) in the computer system of FIG. 8. Each computer 50, 60 includes a system bus 79, where a bus is a set of hardware lines used for data transfer among the components (e.g., entities) of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, touchscreen etc.) to the computer 50, 60. A network interface 86 allows the computer to connect to various other devices attached to a network (e.g., network 70 of FIG. 8). Memory 90 provides volatile storage for computer software instructions 92 and data 94 used to implement embodiments 100, 200, 300, 400, 500, 600, 700 of the present disclosure (e.g., including but not limited to including any of the reasoning engine (inference engine or inferencing engine), controller, processor, memory, or any other device, engine, system, module, or controller described herein). Disk storage 95 provides non-volatile storage for computer software instructions 92 and data 94 used to implement some embodiments of the present disclosure. Note, data 94 may be the same between a client 50 and server 60, however, the type of computer software instructions 92 may differ between a client 50 and a server 60. A central processor unit 84 is also attached to the system bus 79 and provides for the execution of computer instructions.

As illustrated in FIG. 9, in an embodiment, the system 900 includes a processor 84 and a memory 90 with computer code instructions stored therein. The memory 90 is operatively coupled to the processor 84 such that the computer code instructions configure the processor 84 to implement a controller. The controller is configured to reason (e.g. infer), for a respective domain-specific model of one or more domain-specific models, a plurality of relationships within the respective domain-specific model. Each of the plurality of relationships is between a keyword term of a search query inputted by a user via the I/O device interface 82 and a field of the domain-specific model. The controller is further configured to reason (e.g., infer) the plurality of relationships by performing a traversal of the domain-specific model according to domain-specific rules selected by the inputted keyword terms. The controller is further configured to map a first field of a first reasoned (e.g., inferred) relationship to a second field of a second reasoned (e.g., inferred) relationship. The first field and second field are in respective first and second domain-specific models. The controller is further configured to execute the search query based on the mapping. The execution of the search query generates one or more search results presented to the user via the I/O device interface 82.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the disclosure system. Computer program product 92 may be installed by any suitable software installation procedure, as is well known in the art. In another embodiment, at least a portion of the software instructions may also be downloaded over a cable, communication or wireless connection. In other embodiments, the disclosure programs are a computer program propagated signal product 107 (shown in FIG. 8) embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present disclosure routines/program 92.

Embodiments or aspects thereof may be implemented in the form of hardware (including but not limited to hardware circuitry), firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, or some combination thereof, and, thus, the data processors described herein are intended for purposes of illustration only and not as a limitation of the embodiments.

While this disclosure has been particularly shown and described with references to example embodiments thereof, it will be understood by those skilled in the art that various changes in form and details may be made therein without departing from the scope of the disclosure encompassed by the appended claims.

Some embodiments may provide one or more technical advantages that may transform the behavior or data, provide functional improvements, or solve a technical problem. In some embodiments, technical advantages or functional improvements may include but are not limited to improvement of efficiency, accuracy, speed or other effects compared to the existing methods. Some embodiments provide technical advantages or functional improvements in that they overcome functional deficiencies of existing methods. Some embodiments include technical advantages that include but are not limited to performance improvement or scalability compared with existing approaches.

According to some embodiments, other technical advantages or functional improvements may include but are not limited to the following. Some embodiments may provide a technical advantage or functional improvement by improving the performance and efficiency of search queries and returning search results that are highly relevant for a user's needs and more relevant than in existing approaches. By providing an efficient search with targeted search results, embodiments provide functional improvements to one or more domains that have a model representation including but not limited to fields of Human Systems Technology, Human Systems Engineering, Context Sensitive Help, Context Sensitive Guidance, and other fields that utilize domains known to one skilled in the art.

Some embodiments solve a technical problem, thereby providing a technical effect, by one or more of the following. Some embodiments may solve a technical problem, thereby providing a technical effect, by improving the performance and efficiency of search queries and returning search results that are highly relevant for a user's needs and more relevant than in existing approaches. By providing an efficient search with targeted search results, embodiments solve a technical problem and provide a technical effect to one or more domains that have a model representation including but not limited to fields of Human Systems Technology, Human Systems Engineering, Context Sensitive Help, Context Sensitive Guidance, and other fields that utilize domains known to one skilled in the art.

What is claimed is:

1. A method comprising:
for a respective domain-specific model of one or more domain-specific models, reasoning a plurality of intra-model relationships within the respective domain-specific model, each of the plurality of intra-model relationships being between a keyword term of a search query inputted by a user and a field of the domain-specific model, wherein reasoning the plurality of intra-model relationships is performed by traversing the domain-specific model according to domain-specific rules selected by the inputted keyword terms;
mapping a first field of a first reasoned intra-model relationship of the plurality of intra-model relationships between a first keyword term of the search query and the first field to a second field of a second reasoned intra-model relationship of the plurality of intra-model relationships between a second keyword term of the search query and the second field, wherein the first field is in a first domain-specific model of a first domain and the second field is in a second domain-specific model of a second domain, the first domain being exclusive from the second domain;
mapping the second field of the second reasoned intra-model relationship to a third field of a third reasoned intra-model relationship of the plurality of intra-model relationships between a third keyword term of the search query and the third field, wherein the second field is in the second domain-specific model of a second domain and the third field is in a third domain-specific model of a third domain, the second domain being exclusive from the third domain;
executing the search query based on the mapped first inter-model relationship and the mapped second inter-model relationship, wherein the second-model relationship is required to complete the mapping from the first term to the third term, the executing generating one or more search results presented to the user.

2. The method of claim 1, further comprising:
finding one or more facts associated with the inputted keyword terms based on the mapping.

3. The method of claim 1, further comprising:
identifying documents in a data repository associated with the inputted keyword terms along at least one path of the one or more domain-specific models based on the mapping.

4. The method of claim 1, further comprising:
identifying one or more convergent paths within the one or more domain-specific models associated with the inputted keyword terms.

5. The method of claim 1, further comprising:
identifying one or more exploration paths within the one or more domain-specific models associated with the inputted keyword terms.

6. The method of claim 1, further comprising:
identifying one or more comparative evaluations of findings along paths within the one or more domain-specific models associated with the inputted keyword terms.

7. The method of claim 1, further comprising:
postulating an analysis mode defining a domain-specific problem associated with the inputted keyword terms;
assigning one or more values to the postulated analysis mode; and
comparing one or more values associated with the postulated analysis mode.

8. The method of claim 1, wherein at least one of:
the plurality of intra-model relationships includes two or more homogeneous intra-model relationships; and
the first reasoned intra-model relationship and the second reasoned intra-model relationship are heterogeneous intra-model relationships.

9. The method of claim 1, wherein the reasoning includes traversing one domain-specific model of the one or more domain-specific models.

10. The method of claim 1, wherein the reasoning includes traversing across two or more models of the domain-specific models.

11. A system comprising:
a processor; and
a memory with computer code instructions stored therein, the memory operatively coupled to the processor such that the computer code instructions configure the processor to implement:
a controller configured to:
reason, for a respective domain-specific model of one or more domain-specific models, a plurality of intra-model relationships within the respective domain-specific model, each of the plurality of intra-model relationships being between a keyword term of a search query inputted by a user and a field of the domain-specific model, wherein reasoning the plurality of intra-model relationships is performed by traversing the domain-specific model according to domain-specific rules selected by the inputted keyword terms;
map a first field of a first reasoned intra-model relationship of the plurality of intra-model relationships between a first keyword term of the search query and the first field to a second field of a second reasoned intra-model relationship of the plurality of intra-model relationships between a second keyword term of the search query and the second field, wherein the first field is in a first domain-specific model of a first domain and the second field is in a second domain-specific model of a second domain, the first domain being exclusive from the second domain;
map the second field of a second reasoned intra-model relationship to a third field of a third reasoned intra-model relationship of the plurality of intra-model relationships between a third keyword term of the search query and the third field, wherein the second field is in the second domain-specific model of a second domain and the third field is in a third domain-specific model of a third domain, the second domain being exclusive from the third domain; and
execute the search query based on the mapped first inter-model relationship and the mapped second inter-model relationship, wherein the second-model relationship is required to complete the mapping from the first term to the third term, the executing generating one or more search results presented to the user.

12. The system of claim 11, wherein the controller is further configured to:
find one or more facts associated with the inputted keyword terms based on the mapping.

13. The system of claim 11, wherein the controller is further configured to:
identify documents in a data repository associated with the inputted keyword terms along at least one path of the one or more domain-specific models based on the mapping.

14. The system of claim 11, wherein the controller is further configured to:
identify one or more convergent paths within the one or more domain-specific models associated with the inputted keyword terms.

15. The system of claim 11, wherein the controller is further configured to:
identify one or more exploration paths within the one or more domain-specific models associated with the inputted keyword terms.

16. The system of claim 11, wherein the controller is further configured to:
identify one or more comparative evaluations of findings along paths within the one or more domain-specific models associated with the inputted keyword terms.

17. The system of claim 11, wherein the controller is further configured to:
postulate an analysis mode defining a domain-specific problem associated with the inputted keyword terms;
assign one or more values to the postulated analysis mode; and
compare one or more values associated with the postulated analysis mode.

18. The system of claim 11, wherein at least one of:
the plurality of intra-model relationships includes two or more homogeneous intra-model relationships; and
the first reasoned intra-model relationship and the second reasoned intra-model relationship are heterogeneous intra-model relationships.

19. The system of claim 11, wherein the controller is further configured to reason including traversing one domain-specific model of the one or more domain-specific models.

20. The system of claim 11, wherein the controller is further configured to reason including traversing across two or more models of the domain-specific models.

21. A computer program product comprising:
a non-transitory computer-readable medium configured to store instructions for performing an intelligent targeted search, the instructions, when loaded and executed by a processor, cause the processor to:
reason, for a respective domain-specific model of one or more domain-specific models, a plurality of intra-model relationships within the respective domain-specific model, each of the plurality of intra-model relationships being between a keyword term of a search query inputted by a user and a field of the domain-specific model, wherein reasoning the plurality of intra-model relationships is performed by traversing the domain-specific model according to domain-specific rules selected by the inputted keyword terms;
map a first field of a first reasoned intra-model relationship of the plurality of intra-model relationships between a first keyword term of the search query and the first field to a second field of a second reasoned intra-model relationship of the plurality of intra-model relationships between a second keyword term of the search query and the second field, wherein the first field is in a first domain-specific model of a first domain and the second field is in a second domain-specific model of a second domain, the first domain being exclusive from the second domain;
map the second field of a second reasoned intra-model relationship to a third field of a third reasoned intra-model relationship of the plurality of intra-model relationships between a third keyword term of the search query and the third field, wherein the second field is in the second domain-specific model of a second domain and the third field is in a third domain-specific model of a third domain, the second domain being exclusive from the third domain; and
execute the search query based on the mapped first inter-model relationship and the mapped second inter-model relationship, wherein the second-model relationship is required to complete the mapping from the first term to the third term, the executing generating one or more search results presented to the user.

\* \* \* \* \*